(12) United States Patent
Nagy

(10) Patent No.: US 7,325,012 B2
(45) Date of Patent: *Jan. 29, 2008

(54) RELATIONSHIP MANAGEMENT SYSTEM DETERMINING CONTACT PATHWAYS IN A CONTACT RELATIONAL DATABASE

(75) Inventor: Robert M. Nagy, Aurora, IL (US)

(73) Assignee: Interface Software, Inc., Oak Brook, IL (US)

(*) Notice: Subject to any disclaimer, the term of this patent is extended or adjusted under 35 U.S.C. 154(b) by 380 days.

This patent is subject to a terminal disclaimer.

(21) Appl. No.: 10/677,113

(22) Filed: Sep. 30, 2003

(65) Prior Publication Data

US 2004/0128322 A1 Jul. 1, 2004

Related U.S. Application Data

(63) Continuation-in-part of application No. 09/455,877, filed on Dec. 6, 1999.

(60) Provisional application No. 60/414,701, filed on Sep. 30, 2002.

(51) Int. Cl.
*G06F 17/00* (2006.01)
(52) U.S. Cl. .................. 707/104.1; 707/9; 707/102
(58) Field of Classification Search .............. 707/1, 707/9, 10, 100, 102, 104.1, 5; 709/201, 223, 709/224, 226; 705/22, 26
See application file for complete search history.

(56) References Cited

U.S. PATENT DOCUMENTS 5,295,256 A 3/1994 Bapat
5,485,567 A 1/1996 Banning et al.
5,652,789 A * 7/1997 Miner et al. ........... 379/201.01

(Continued)

FOREIGN PATENT DOCUMENTS

NL 1009376 C6 7/1998
WO WO 99/23591 A1 5/1999

(Continued)

OTHER PUBLICATIONS

International Search Report for PCT/US03/31168 mailed Jan. 9, 2004.

(Continued)

*Primary Examiner*—Jeffrey Gaffin
*Assistant Examiner*—Jacques Veillard
(74) *Attorney, Agent, or Firm*—Marshall, Gerstein & Borun LLP

(57) ABSTRACT

A relationship management system using a database that stores contact information defining a set of contact individuals associated with each of the users of the database. An input routine stored on a computer readable medium is executed on a processor to accept an input of a target individual from a starting person who is a user of the system. A contact information access routine is executed on the processor to access contact information in the form of user-contact pairs stored in the database that are associated with the starting person and the target individual. A relationship connection routine is executed on the processor to utilize the user-contact pairs accessed by the contact information access routine and determine relationship connections that may link the starting person and the target individual. A display routine is executed to display to the starting person an indication of the potential relationship connections.

28 Claims, 17 Drawing Sheets

U.S. PATENT DOCUMENTS

| | | | |
|---|---|---|---|
| 5,737,726 A | | 4/1998 | Cameron et al. |
| 5,813,009 A | | 9/1998 | Johnson et al. |
| 5,905,496 A | | 5/1999 | Lau et al. |
| 5,950,193 A | * | 9/1999 | Kulkarni ..................... 707/3 |
| 6,014,647 A | * | 1/2000 | Nizzari et al. ............... 705/39 |
| 6,073,138 A | | 6/2000 | de l'Etraz et al. |
| 6,141,658 A | | 10/2000 | Mehr et al. |
| 6,253,203 B1 | | 6/2001 | O'Flaherty et al. |
| 6,269,369 B1 | * | 7/2001 | Robertson ................. 707/10 |
| 6,311,191 B1 | | 10/2001 | Retallick |
| 6,324,541 B1 | * | 11/2001 | de l'Etraz et al. ........ 707/104.1 |
| 6,392,669 B1 | | 5/2002 | Matoba et al. |
| 6,549,933 B1 | | 4/2003 | Barrett et al. |
| 6,701,348 B2 | * | 3/2004 | Sommerer ................. 709/206 |
| 6,714,916 B1 | * | 3/2004 | Robertson et al. ............. 705/9 |
| 6,760,727 B1 | * | 7/2004 | Schroeder et al. ............ 707/10 |
| 6,820,083 B1 | * | 11/2004 | Nagy et al. ..................... 707/9 |
| 6,990,495 B1 | * | 1/2006 | Grason et al. ................. 707/10 |
| 7,177,880 B2 | * | 2/2007 | Ruvolo et al. ........... 707/104.1 |
| 7,228,335 B2 | * | 6/2007 | Caughey ..................... 709/206 |
| 7,240,298 B2 | * | 7/2007 | Grossman et al. ........... 715/854 |

OTHER PUBLICATIONS

INTERFACE, "Interaction Enterprise Relationship Management," Administrator's Guide, pp. 1-276, 1998.
INTERFACE, "Interacation Enterprise Relationship Management," Getting Started Guide, pp. 1-34, 1998.

\* cited by examiner

50

| CONTACT-FOLDER PAIR | OPT-IN FLAG | RELATIONSHIP DESCRIPTION | RELATIONSHIP TYPE | RELATIONSHIP STRENGTH |
|---|---|---|---|---|
| 01257/54341 | X | Jane and I worked together at Fineberg & Assoc. | Business | 7 |
| 01257/54251 | X | My son plays soccer with Jane's son | Social | 3 |
| 01397/54231 | O | I went to high school with Frank | Personal | 2 |
| 01243/54132 | X | Ted is my brother-in-law | Family | 10 |
| 01653/54521 | X | I worked with Jim at McDonnell Douglas | Business | 6 |

| CONTACT-USER PAIR | OPT-IN FLAG | RELATIONSHIP DESCRIPTION | RELATIONSHIP TYPE | RELATIONSHIP STRENGTH |
|---|---|---|---|---|
| 01257/94341 | X | Jane and I worked together at Fineberg & Assoc. | Business | 7 |
| 01257/94251 | X | My son plays soccer with Jane's son | Social | 3 |
| 01397/94231 | O | I went to high school with Frank | Personal | 2 |
| 01243/94132 | X | Ted is my brother-in-law | Family | 10 |
| 01653/94521 | X | I worked with Jim at McDonnell Douglas | Business | 6 |

INT_AUX_DIRECTORY

90

| DIRECTORY_ID | INTEGER | NOT NULL |
|---|---|---|
| DIRECTORY_SRC_ID | INTEGER | NOT NULL |

| DIR_TYP_ID (FK) | INTEGER | NOT NULL |
|---|---|---|
| DIRECTORY_NM | VARCHAR (80) | NOT NULL |
| DIRECTORY_DESC | VARCHAR (254) | NULL |
| OWNER_ID | INTEGER | NOT NULL |
| CREATE_ID | INTEGER | NOT NULL |
| CREATE_DT | DATETIME | NOT NULL |
| LAST_EDIT_ID | INTEGER | NULL |
| LAST_EDIT_NM | VARCHAR (60) | NOT NULL |
| LAST_EDIT_DT | DATETIME | NOT NULL |
| FIELD_1 | VARCHAR (60) | NULL |
| FIELD_2 | VARCHAR (60) | NULL |
| FIELD_3 | VARCHAR (60) | NULL |
| FIELD_4 | VARCHAR (60) | NULL |
| CHANGE_DT | DATETIME | NOT NULL |
| TRAN_SRC_ID | INTEGER | NOT NULL |
| FLAG_INITIAL_IND | SMALLINT | NOT NULL |
| LARGE_DIR_IND | SMALLINT | NOT NULL |
| LISTING_TYP_IND | SMALLINT | NOT NULL |
| USAGE_IND | SMALLINT | NOT NULL |
| LIST_OWNERSHIP_SCOPE | SMALLINT | NOT NULL |
| SHARE_EXISTENCE_IND | SMALLINT | NOT NULL |
| AUDIT_IND | SMALLINT | NOT NULL |
| SHOW_FLAG_IND | SMALLINT | NOT NULL |
| DEFAULT_PF_ACCESS_IND | SMALLINT | NOT NULL |
| FLAG_DESC | VARCHAR (254) | NULL |
| SYS_ID | INTEGER | NULL |
| SYS_SRC_ID | INTEGER | NULL |
| SYS_IA_EDIT | INTEGER | NULL |
| RESERVED | VARCHAR (254) | NULL |
| timestamp | TIMESTAMP/DATE | NULL |

FIG. 6

INT_AUX_DIR_LIST

92

| CONTAIN_DIR_ID | INTEGER | NOT NULL |
|---|---|---|
| CONTAIN_DIR_SRC_ID | INTEGER | NOT NULL |
| LISTING_ID (FK) | INTEGER | NOT NULL |
| LISTING_SRC_ID (FK) | INTEGER | NOT NULL |

| OWN_DIR_ID (FK) | INTEGER | NOT NULL |
|---|---|---|
| OWN_DIR_SRC_ID (FK) | INTEGER | NOT NULL |
| CREATE_ID | INTEGER | NOT NULL |
| CREATE_DT | DATETIME | NOT NULL |
| LAST_EDIT_ID | INTEGER | NULL |
| LAST_EDIT_NM | VARCHAR (60) | NOT NULL |
| LAST_EDIT_DT | DATETIME | NOT NULL |
| FLAG_IND | SMALLINT | NOT NULL |
| EXISTENCE_IND | SMALLINT | NULL |
| EXISTENCE_DESC | VARCHAR (254) | NULL |
| CHANGE_DT | DATETIME | NOT NULL |
| TRAN_SRC_ID | INTEGER | NOT NULL |
| RESERVED | VARCHAR (254) | NULL |
| timestamp | TIMESTAMP/DATE | NOT NULL |

FIG. 7

RELATIONSHIP MANAGEMENT SYSTEM DETERMINING CONTACT PATHWAYS IN A CONTACT RELATIONAL DATABASE

CROSS REFERENCE TO RELATED APPLICATIONS

This application is a continuation-in-part of U.S. patent application Ser. No. 09/455,877, entitled a "Relationship Management System That Provides an Indication of Users Having a Relationship With a Specified Contact", filed Dec. 6, 1999, and also is a non-provisional application claiming priority from U.S. Provisional Patent Application Ser. No. 60/414,701 entitled a "Relationship Management System Determining Contact Pathways in a Contact Relational Database," filed Sep. 30, 2002, which are both incorporated herein by reference in their entirety.

BACKGROUND

The present invention relates generally to relationship management systems and, more particularly, to a relationship management system that determines a set of users having a relationship of some kind with a specified contact and/or a user associated with the relationship management system.

Relationship management systems typically use one or more relational databases to, for example, store data or information pertaining to contacts, which may be individual persons, corporations, etc. The information stored in the database for any particular contact may include, for example, phone numbers, facsimile numbers, post office addresses, electronic-mail (e-mail) addresses, etc. and this information may be used to produce mailing lists and customer lists, to send facsimiles, e-mails, or to store contact information to be retrieved at any desired time. One of the simplest and most common uses of a relationship management system is as a centralized electronic address book that can be used by any number of individuals or groups within, for example, a corporation, a law firm, etc. for any number of reasons, such as keeping track of contact information, making sales calls, sending letters, facsimiles, e-mails, etc.

At least one known relationship management system stores each of the different types of contact information (such as names, post office, street or e-mail addresses, facsimile and phone numbers, company affiliations, titles, etc.) in a database only once and uses folders to provide access to the stored contact information to any number of the users of the relationship management system. Each contact stored within the database may be referenced by any number of folders and each folder typically has access rights that define one or more users of the relationship management system that can access the folder and, thereby, access the contact information associated with the contacts referenced by the folder. There may be different types of folders, such as private or personal folders in which personal contacts, business contacts, etc. are referenced, business folders, group folders set up for specific groups of users, task folders set up for specific tasks, etc. A user may add, change or delete the contact information for any of the contacts within the folders to which the user has access and may add new contacts and associated contact information to the database by adding a new contact to the folder. Each folder may reference more than one contact and each contact may be referenced by more than one folder. Thus, for example, if two users know the same person (a contact), the personal or private folders for each of these users may reference that contact and, thus, each of these users may have access to the contact information associated with that contact, even though the contact information for that contact is stored only once in the database.

The knowledge of which members of a set of users of a relationship management system know a particular person and how the users know that particular person may be helpful in making presentations to that particular person, performing sales activities in which that particular person is involved, conducting research about the particular person or a corporation at which the particular person works, etc. Thus, it can be helpful for one user of a relationship management system to find out which of the other users of that system (who typically work for or are affiliated with the same company or organization) know a particular person or contact. The knowledge of which users of a relationship management system have a relationship of some kind with a particular person or contact stored in the relationship management system is referred to herein as user-contact reference information.

In the past, relationship management systems, while allowing users to access contact information about contacts stored within the database associated with the relationship management system, did not provide any user with the ability to determine, quickly and accurately, which of the other users of the system knew or had a relationship of some kind with a particular contact. In fact, in the past, information about which users of the system knew which contacts had to be manually entered into the database system as a separate list. Because this list of user-contact reference information changes each time a contact is added to a folder or is deleted from a folder within the database, the user-contact reference list had to be constantly updated, which was tedious, time consuming and prone to data entering errors. Furthermore, the updating of the user-contact reference list was typically given a low priority and, thus, the information within this list was frequently out of date. Likewise, these manually created lists did not provide any information on the type of relationship between the contact and the user referencing the contact, such as how these people knew each other or how they met, what specific type of relationship exists, such as a business or personal relationship, or the strength of the relationship.

SUMMARY

According to one disclosed embodiment, a relationship management system comprises a database storage routine stored on a computer readable medium and adapted to store, within a database, contact information for one or more contacts, an indication of one or more contacts referenced by one or more folders, and a set of contact-folder pairs, wherein each contact-folder pair includes a contact indication that indicates one of the contacts and a folder indication that indicates one of the folders. The reference routine searches the contact indications of the contact-folder pairs for the specified contact to locate at least one contact-folder pair associated with the specified contact. The reference routine also determines one of the users that knows the specified contact from the folder indication of the one of the contact-folder pairs as a user having access rights to the folder specified by the folder indication of the one of the contact-folder pairs.

The relationship management system also has a reference routine adapted to be executed by a processor to access the database to determine which of the users of the relationship management system knows a specified contact. A display routine is stored by the computer readable medium and adapted to be executed on the processor to display an indication of the determined users that know the specified contact.

According to another disclosed example, a relationship management system is configured to be used with a processor, a display device and a database to store contact information defining a set of contact individuals associated with each of a plurality of users of the database. The system includes a computer readable medium and an input routine stored on the computer readable medium that is adapted to be executed on the processor to accept a designation of a target individual from a starting person. A contact information access routine stored on the computer readable medium and adapted to be executed on the processor accesses contact information in the form of user-contact pairs stored in the database that are associated with at least one of the starting person and the target individual. A relationship pathway determination routine is further stored on the computer readable medium and adapted to be executed on the processor to utilize the user-contact pairs accessed by the contact information access routine and to determine at least one relationship pathway that links relationships between the starting person and the target individual such that any two adjacent entities in the relationship pathway comprise one of the user-contact pairs. A display routine is stored on the computer readable medium and is configured to be executed on the processor to display an indication of the relationship pathway on the display device.

BRIEF DESCRIPTION OF THE DRAWINGS

FIG. 4 is a block diagram of a join table stored in a database associated with a relationship management system which stores contact-folder pair information and which may be used to generate the display of FIG. 3.

FIG. 5 is a block diagram of a table stored in a database associated with a relationship management system which stores user-contact pair information and which may be used to generate the display of FIG. 3.

FIG. 6 is a depiction of an example folder table illustrating some exemplary attributes of each folder stored in a database associated with a relationship management system.

FIG. 7 is a depiction of an example join table illustrating some exemplary attributes of each of a set of contact-folder pairs stored in a database associated with a relationship management system.

DETAILED DESCRIPTION

Figure 1:
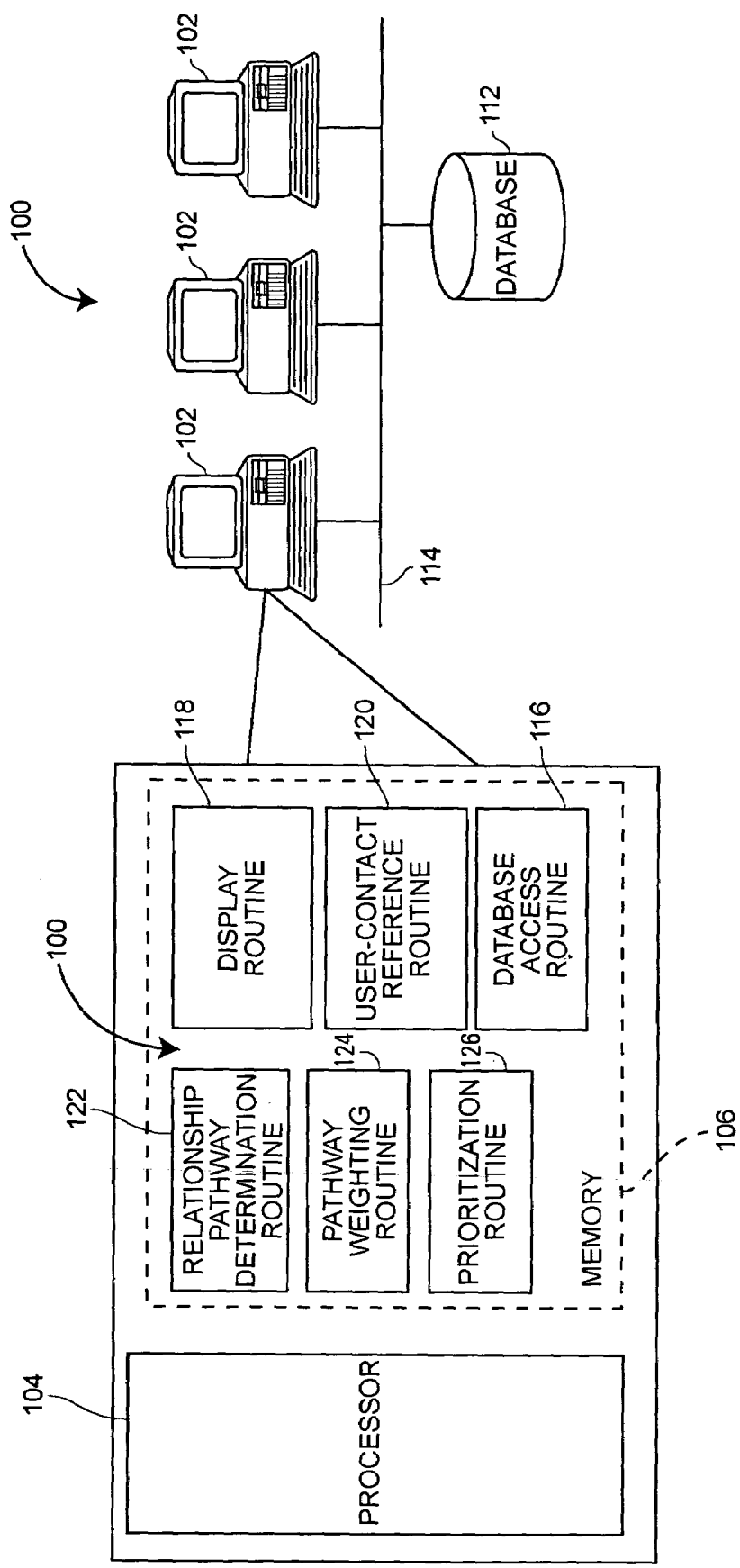
FIG. 1 is a block diagram of an information system network on which a relationship management system may be implemented.

Referring to FIG. 1, an information system 100 on which a relationship management system can be implemented is illustrated. The information system 100 includes a number of workstations or user interfaces 102, each having an associated processor 104 and memory 106 storing a relationship management routine 110 including numerous routines therein. The workstations 102 are interconnected to a database 112 via a communication link 114 which may be, for example, a local area network (LAN) link. The information system 100 may include any desired number of user interfaces 102 and each of the user interfaces 102 may include any desired type of computer or processor that uses any operating system such as the Microsoft Windows® operating system, a UNIX operating system, etc. to execute programs or applications. Likewise, the database 112 may be any suitable or desired type of database with an associated database server (not shown) which may be, for example, a Microsoft SQL database server, an Oracle database server, etc. While the database 112 is illustrated as being a standalone unit, the database 112 could be integrated into one of the user interfaces 102, if so desired. Still further, the communication link 114 may be any desired type of LAN connection such as a Microsoft NT or a Novel Netware, or may be any other desired type of communication network. While the implementation of the communication link 114 as a LAN preferably uses a TCP/IP protocol, any other communication protocol may be used as well to provide communications between the user interfaces 102 and the database 112.

Generally, the database 112 stores information about any number of contacts, which may be persons, corporations or other entities. The database 112 may store different types of contact information, such as name and title information, post office, street and electronic address information, phone number and facsimile number information, the nature or type of contact (e.g., personal or business), business affiliations (e.g., work or worked at the same company), organization affiliations (e.g., support same charitable organization), educational affiliations (e.g., attended the same college), strength ratings of the relationship between the user and the contact, etc. for each contact in different contact information tables. Further, the database 112 stores indications of folders and each folder includes a reference to zero, one or more of the contacts within the database 112. Each folder has access rights enabling one or more particular users of the relationship management routine 110 to use the folder. The user having access rights to a folder can view or otherwise access information pertaining to the contacts referenced by that folder. Thus, the user having access to a folder can place a contact within the folder (i.e., can reference a contact using the folder) and can store and retrieve contact information from the contact information tables within the database 112 pertaining to the contact referenced by the folder. A folder can be a private or personal folder, in which case the folder is "owned" by an individual and can be used to store, for example, personal, business and other contact information for that individual. Alternatively, a folder can be a group folder used by a group of users, for example, to reference contacts making up a mailing list, a customer list, etc., to reference contacts associated with a particular project, such as a business deal that is in progress, to reference contacts having some common characteristic, such as lawyers, doctors, etc. or can be a folder created for any other purpose or activity. Of course, folders may be used in any other manner to reference contacts of any desired nature and folders may be accessible by one or more users. As used herein, the term folder refers to any programming construct that enables certain contact information to be visible to one or more particular users of a relationship management system.

As illustrated for one of the user interfaces 102 in FIG. 1, each of the interfaces 102 includes a number of routines within the relationship management routine 110, as mentioned previously, that are executable by the processor 104. The routines include a database access routine 116 that communicates with the database 112 and accesses data within the database 112 using any desired type of communication layer. The database access routine 116, if desired, may use a database driver, such as the Microsoft DB-LIB driver, to perform communications with the database 112. Also included is a display routine 118 that, as is typical in relationship management systems, creates user interface screens for display on a display screen or other display device associated with the user interface 102 to enable communication with the user via the user interface 102. The routines 116 and 118 operate together to enable a user to enter information, such as contact information related to persons or corporations or other entities to be stored in the database 112, to delete information from the database 112, to access information stored in the database 112, etc. The user may also use the routines 116 and 118 to perform functions using contact information stored in the database 112, such as to send e-mails, facsimiles or regular mail, to create mailing lists, customer lists, etc. The display device, referred to above, may include not only a computer screen, but may be devices such as a printer, audio devices, etc. that communicate information to be output to the user.

In order to effect an automated determination of relationship pathways, a further use of the database access routine 116 may be to input or designate a named target individual that the user or a starting person desires to meet. This further function of the routine 116 is used to initiate a determination of actual or potential relationship connections or pathways between the starting person and a target person through other routines of the system 110 that are stored in memory 106 (and to be discussed below). This functionality essentially determines persons within the database who know or may know both the starting and target individuals or a string of people who know each other and can form a link between the starting person and the target person.

Further serving to effect the functionality of determining relationship pathways within the relationship management system 110 illustrated in FIG. 1, a user-contact reference routine 120, which is stored in the memory 106, accesses the database 112 to determine which users of the relationship management system know (i.e., have a relationship of some kind with) the designated target person, as well as those who know the starting person, who may or may not be the specifying user. This routine 120 accesses the relationships as user-contact pairs. One example of such user-contact pairs is where one person of the pair is a user of the relationship management system and the other person is a contact person stored in the user's contact list or folder. Another example includes a pairing where one person is the target person and the other person is a user of the database who either has or may have a relationship with the target person. Additionally, as will be explained later, the routine 120 may also access intermediate user-contact pairs for determining further relationship pathways.

Other methods of storing and determining relationships between users and contacts using tables in the database 112 may be used as well to enable the user-contact routine 120 to determine which users have a relationship of some kind with any particular contact. The user-contact routine 120, as described herein, enables the relationships between users of the relationship management system and any particular contact stored in the database associated with the system to be determined quickly and accurately because this information is automatically stored, created or deleted when a user references a contact or deletes a contact from a folder or otherwise indicates a relationship with a contact. Furthermore, because the relationship information is stored in and determined from tables, such as those used to perform other functions within the relationship management system, no one has to manually enter or update a user-contact reference list, which makes the relationship information determined by the user-contact reference routine 120 described herein more accurate and reliable. Still further, an opt-in flag enables a user to hide the fact that the user has a relationship with a particular contact, assuring privacy where needed or desired. Likewise, the relationship description, type and strength or other relationship description fields provide a user with more information about the relationships between users and any specified contact than that provided by a manually created list of user-contact relationships typically associated with known systems.

In order to determine relationship pathways, the relationship management system 110 also includes a relationship pathway determination routine 122. This routine 122 utilizes the user-contact pair information garnered by the user-contact reference routine 120 to determine or plot specific relationship pathways or connections that may found among the user-contact pairs. As an example of how routines 120 and 122 work together, it is assumed that a user of the database (e.g., "Ed Roberts"), who is, in this case, the "starting person", desires to find a relationship connection to a target person. The routine 120 first searches the database 112 for user-contact pairs including the user. In other words, the routine 120 will access Ed Robert's folder of contacts to determine the identity of his contacts. Additionally, the routine 120 searches the database 112 for user-contact pairs having the target person as a contact. That is, the routine 120 determines all users of the database having the target person as a contact. Once this information is obtained, the relationship pathway determination routine 122 will plot relationship pathways, connections or intersections between the two groups of user-contact pairs. If no intersections are found or further degrees of relationships linkings are desired, the routine 120 may again be called to obtain further intermediate user-contact pairs including user-contact pairs for contact individuals in Ed Robert's folder, as well as user-contact pairs for the users having the target person as a contact. The relationship pathway determination routine 122 will then plot further pathways between the starting person and the target person by finding intersecting intermediate user-contact pairs.

Figure 2:
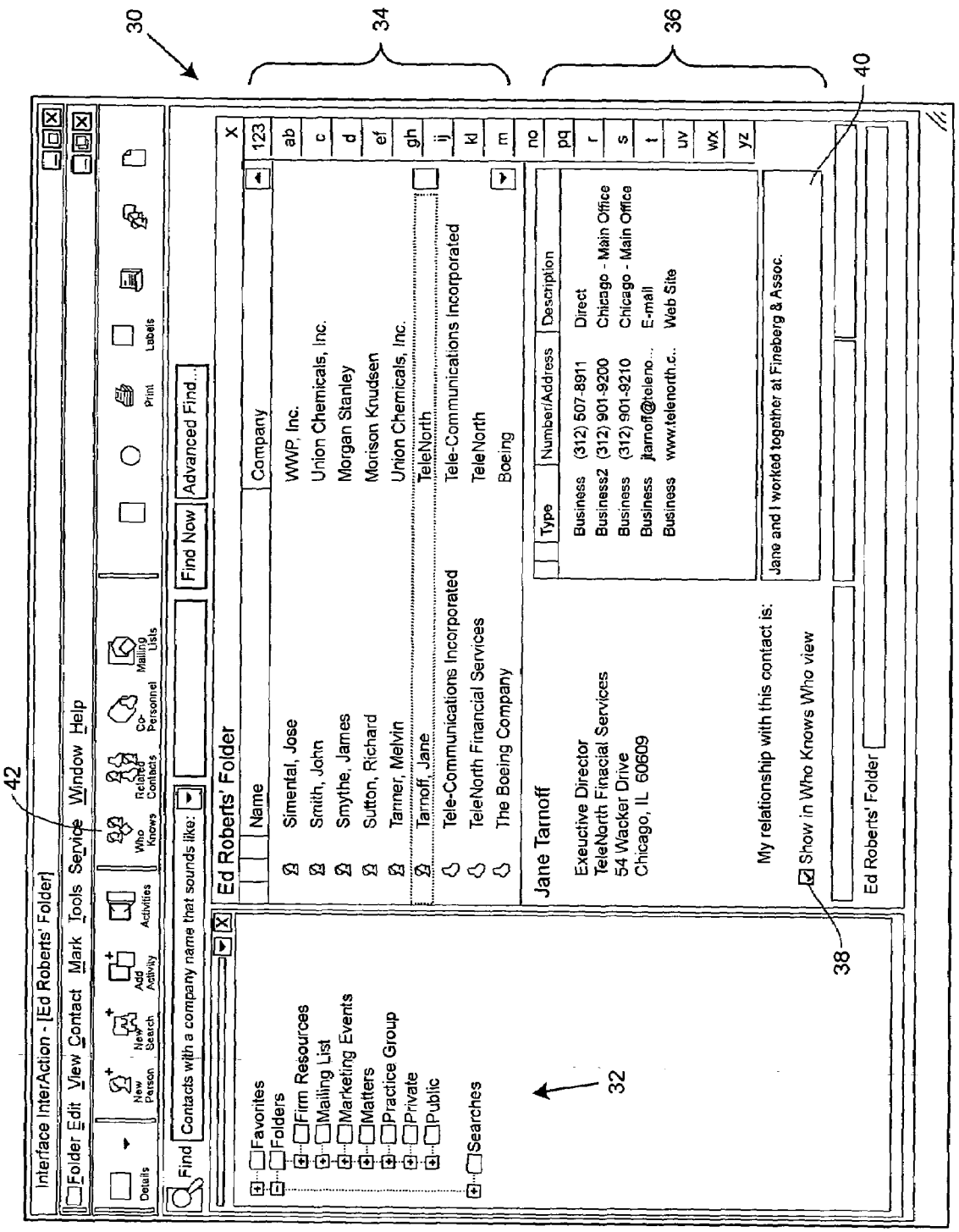
FIG. 2 is an example screen display used in a relationship management system to enable a user to reference contact information for one or more contacts stored in a database and to use a user-contact reference routine to determine which users of the relationship management system have a relationship with a specified contact.

Referring now to FIG. 2, a screen display 130 which may be created by the routine 118 to display the contents of a folder, in this case, Ed Roberts' private folder, is illustrated. The screen display 130 includes a browser section 132 illustrating the folders to which the user (in this case, presumably Ed Roberts or someone else having access to Ed Roberts' private folder) has access. These folders are illustrated as firm resources folders, mailing list folders, marketing event folders, matter folders, practice group folders, private folders, and public folders. Of course, these folder names and types are used as examples only and other types or kinds of folders could also exist within the database 112. In any event, the Ed Roberts' private folder is illustrated in a folder view 134 which includes a list of contacts referenced by Ed Roberts' private folder. As illustrated in FIG. 2, a number of personal contacts including Jose Simental, John Smith, etc. as well as a number of corporate contacts, including TeleCommunications Incorporated, TeleNorth Financial Services, etc. are listed or are referenced by Ed Roberts' private folder. Of course, contacts, such as personal contacts, may have associated companies which may be other contacts stored within the database 112. Thus, John Smith is associated with Union Chemicals, Inc., as illustrated in the folder view 134.

Still further, particular contact information may be displayed about a selected one of the contacts (illustrated as Jane Tarnoff in the display screen 130). As illustrated in a contact information view 136, the business association, address, two business phone numbers, a facsimile number, an e-mail address, and a web site address for Jane Tarnoff are illustrated as the contact information stored for the contact Jane Tarnoff within the database 112. Of course, as indicated above, the different types of contact information for Jane Tarnoff (or any other contact) are stored in different tables within the database 112 and this information, as stored in the contact information tables, reference the contact ID for Jane Tarnoff (or some other contact ID). The different information related to each type of contact information may be stored in different fields of the contact information tables. Thus, for example, the table for post office address information may include fields for title information, street location, city, state and zip code information. The table for phone numbers may include a type (such as business, home, alternate business, etc.) field, a nature field, such as whether the number is a phone number or a facsimile number (illustrated as icons in the contact information view 136), a number field, and a description field. This information is displayed in different portions of the contact information view 136 of FIG. 2.

Still further, as illustrated in FIG. 2, the contact information view 136 includes an opt-in box 138 which is used by the user-contact reference routine 120. The opt-in box 138 may be selected by checking (or not checking) the box 138 which sets or does not set an opt-in flag in a field within the database 112, to be described hereinafter. Similarly, the contact information view 136 includes a relationship description section 140 in which the user (in this case any user having access to Ed Roberts' private folder) can place a description of the relationship between the user (to which the folder belongs) and the contact. The text entered into the description section 140 is also stored in a field in the database 112 as described hereinafter. Of course, other types of relationship description information may also be entered by the user. For example, a simple description of the nature or type of relationship may be chosen from a predetermined set of descriptions, such as whether the relationship is a business, personal, social, family, etc. relationship. Alternatively or in addition, an indication of the strength of the relationship, such as a number ranging from one to ten with ten being a very strong relationship and one being a very weak relationship (as in, the user barely knows the contact) may be entered by the user.

It will be understood that the other folders which reference the Jane Tarnoff contact, especially other private folders, will have similar opt-in and description fields to be used to describe the relationship which these other users have with Jane Tarnoff. Likewise, any of the other contacts referenced by Ed Roberts' folder may provide similar opt-in and description fields to enable the relationships between Ed Roberts and these other contacts to be discovered and described by the user-contact reference routine 120.

Figure 3:
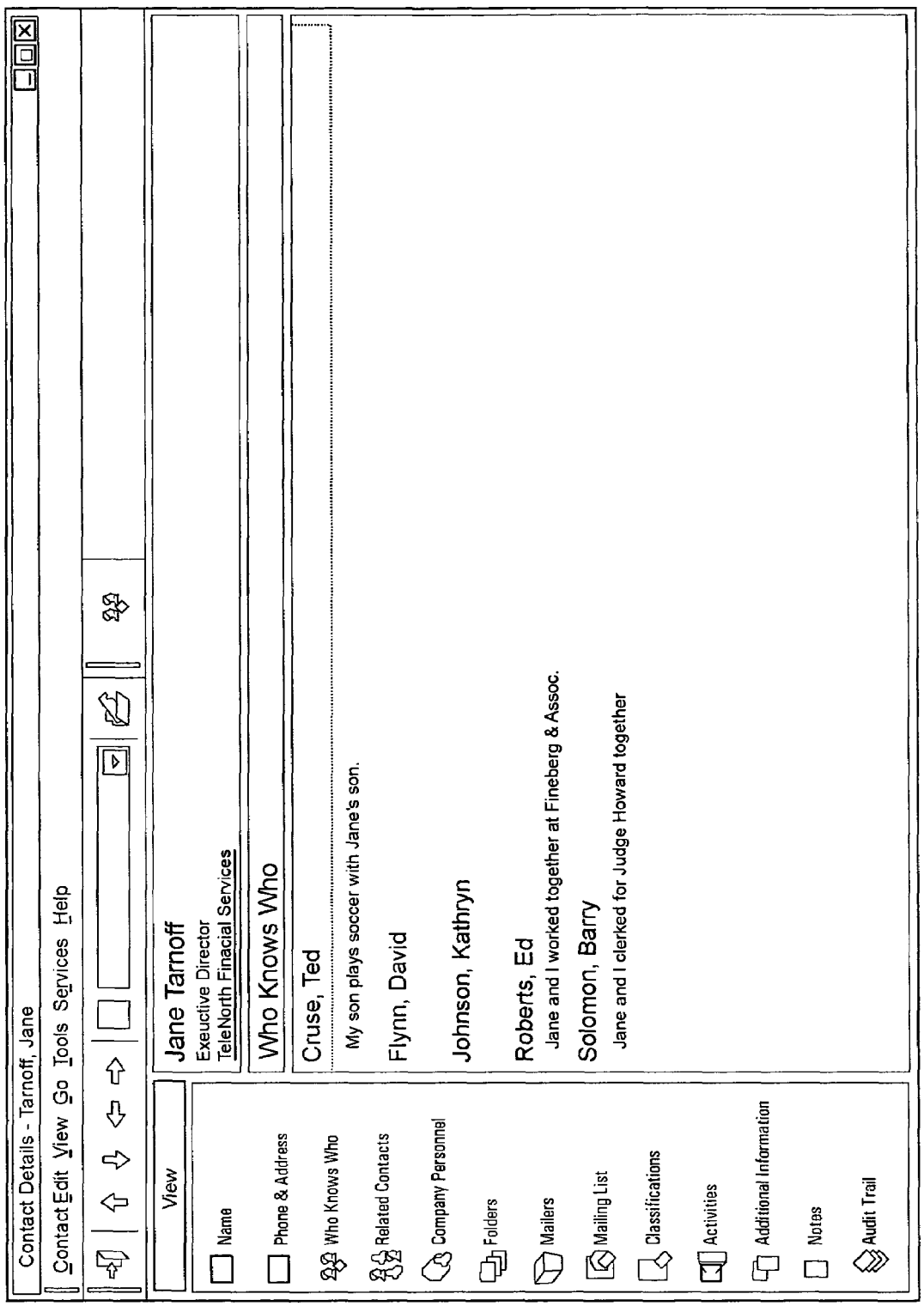
FIG. 3 is an example screen display illustrating a list specifying which users have relationships with a specified contact and some information about the nature of these relationships.

In any event, when a user, such as the user viewing the Ed Roberts' folder wants to find out which other users know or have some relationship with a contact, in this case, Jane Tarnoff, the user can select the Who-Knows-Who™ feature 142 which causes the system 100 to implement the user-contact reference routine 120 which searches the database 112 for all of the users or folders, or some subset of the users or folders, such as all private folders, which reference the Jane Tarnoff contact and which have set the opt-in flag to illustrate this relationship. Upon running such a search, the user-contact reference routine 120 may then use the display routine 118 to display a screen such as that illustrated in FIG. 3 which shows the results of the search for the users who know the Jane Tarnoff contact. As illustrated in FIG. 3, five users (Ted Cruse, David Flynn, Kathryn Johnson, Ed Roberts and Barry Solomon) know or have referenced the Jane Tarnoff contact in their private folder and have set the opt-in flag to enable this relationship to be illustrated by the user-contact reference routine 120. Only three of these users have placed a description in the description field 140 for Jane Tarnoff. With the list of FIG. 3, the user who executed the user-contact reference routine 120 can next talk to any of the other users (Ted Cruse, David Flynn, etc.) about Jane Tarnoff to get more specific information about Jane Tarnoff, such as her likes and dislikes, etc. Likewise, the user who executed the user-contact reference routine 120 can determine which of the other users to talk to first based on the description or nature of the relationship displayed in the list of FIG. 3.

Methods for enabling the user-contact reference routine 120 to determine which of the users of the relationship management system know which contacts will be now be described in more detail with respect to FIGS. 4-14. Generally speaking, a set of user-contact pairs are stored within the database 112 and each of these user-contact pairs evidences the existence of a relationship of some kind between the contact indicated by the contact portion of the user-contact pair and the user indicated by the user portion of the user-contact pair. The contact portion may directly or indirectly indicate a particular contact and may be, for example, a contact ID. Likewise, the user portion of the user-contact pair may directly or indirectly indicate one or more particular users. The user portion may be, for example, a user ID or a folder ID. If the user portion is a folder ID, then the user associated with the user-contact pair may be one or more of the users having access rights to the folder specified by the folder ID. However, the user-contact pair may include any other type of information which indicates, either directly or indirectly, a relationship between a contact and a user.

Referring to FIG. 4, the database 112 may include (store) a join table 150 which may have a number of fields. The first field 152 (illustrated as the first column of the table 100) is a contact-folder pair field in which a contact ID and a folder ID pair for every contact in every folder that is to be used in performing the determination of which users know a specified contact is listed. While the contact and folder IDs are illustrated in FIG. 4 as being in a single column or field, they would typically be stored in separate columns or fields within the database 112. In any event, there will be a separate contact-folder pair for each of the contacts illustrated in the Ed Roberts' folder of FIG. 2 where the contact ID changes but the folder ID remains the same (because all of these contacts are in the same folder). Of course, the same contact within different folders will produce contact-folder pairs having the same contact ID but having different folder IDs. For each contact-folder pair, an opt-in flag field 154 (the second column of the table 150) exists. If the opt-in flag is not set (O), then the user-contact reference routine 120 will not use the contact-folder pair in identifying which users know a specified contact and will not display this relationship in the results of the search performed by the user-contact reference routine 120. As indicated with respect to FIG. 2, the opt-in flag is set (X) by selecting or not selecting the box 138. Furthermore, each entry in the join table 150 includes a relationship description field 156 in which the user entered description of the relationship is stored. The description field 156 corresponds to the section 140 of FIG. 2. Likewise, other fields may exist, such as a predetermined description field 158 (storing a simple descriptor of the type of the relationship) and a relationship strength field 160 indicating the strength of the relationship, as described above. The join table 150, which may be created and used to specify which folders reference which contacts, is stored in the database 112 and is updated each time a contact is added to folder or deleted from a folder. Of course, the information stored in the fields 154, 156, 158 and 160 may be changed by users at any time.

When executing, the user-contact reference routine 120 may access the join table 150 and search for the contact ID in each of the contact-folder pairs within the contact-folder pair field(s) 152. Upon finding the contact ID, the routine 23 determines the ID of the folder in the pair and uses this folder ID to identify the user(s) who has (have) a relationship with the contact. In particular, the users having access to the identified folder, or the primary user of the identified folder may be determined as the user having the relationship with the contact. If desired, the folder name may be used as the user having the relationship with the contact. In some cases, the user contact reference routine 120 may only search for contacts in certain classes or types of folders, such as privately owned folders, to assure that there is a one-to-one user-to-contact relationship. However, this need not be the case and more than one user may be identified as the user having the relationship with the contact for each contact-folder pair. If the user-contact reference 120 is only used, for example, with private folders, the routine 120 determines the type of the folder (which is typically stored as an attribute of the folder in a folder table) and discards or dismisses contact-folder pairs in which the type of the folder is not a private folder.

In any event, whenever the user-contact reference routine 120 identifies a contact folder pair for the particular contact and the folder is of the appropriate type, the routine 120 checks the status of the opt-in flag in the field 154 for that contact-folder pair. If the opt-in flag is set, then the relationship is illustrated to the user in a list or results screen, such as that of FIG. 3, which may identify the user(s) associated with the folder in the identified contact-folder pair. The information in the fields 156, 158 and 160 may also be displayed to the user in the results screen. Of course, it will be understood that the opt-in flag can be set or not set to cause the relationship to be illustrated in the results screen and the opt-in flag could just as well be an opt-out flag, both of which are considered to be the same thing herein and will be described as an opt-in flag.

In another embodiment, a separate table called a user-contact table could be created within the database 112 and used to enable the user-contact reference routine 120 to operate. Referring now to FIG. 5, a user-contact table 170 includes a first column or field 172 which holds, for example, a contact ID and a user ID pair and columns or fields 174, 176, 178 and 180 which are the same as the fields 154, 156, 158 and 160 of FIG. 4, namely, the opt-in flag field 174, the user defined description field 176, the preset relationship type field 178 and the relationship strength field 180. Again, while the contact and user IDs are illustrated in FIG. 5 as being in a single column or field, they would typically be stored in separate columns or fields within the database 112. In this case, each time a user performs some activity which references a contact, such as putting a contact within a folder to which the user has access, or performing some other function, such as requesting information about the contact, performing a search on the contact etc., the database access routine 116 may ask the user whether or not the user wants the relationship with the contact to be used in the future in the user-contact reference function. If the user says yes, the user ID and contact ID may then be stored as a pair in the user-contact pair field 172, the opt-in flag can be set (or not set) and the associated relationship information such as the relationship description, the relationship type, and the relationship strength information may be provided by the user and stored in the user-contact table 170. This relationship information may, for example, be provided by the user using the screen 130 of FIG. 2 when the user adds a contact to a private folder or may be queried from the user when the user performs some other function to indicate that the user knows or has a relationship with a contact. A user-contact pair may also be deleted when a user removes a contact from a folder. If desired, however, the user may be prompted to see if the user wants to delete the user-contact pair from the table 170 when a user removes a contact from a folder (or at other times) to thereby enable a user-contact pair to exist and be discovered by the user-contact reference routine 120 even though the user may not have access rights to a folder referring to that contact. The user-contact table 170 of FIG. 5 enables the relationship management system to capture user-contact relationships even when a user does not place a contact within a folder to which the user has access or after a user has deleted a contact from that user's folder.

FIG. 6 illustrates a folder table 190 which may be created and stored in the database 112 to, among other things, enhance the operation of the user-contact reference routine 120 described herein. The folder table 190 is a table within a standard data model and is illustrated as defining the type of attributes in the left-hand column, the type of data stored by the attributes in the middle column and whether the attributes are required fields (NOT NULL) or non-required fields (NULL) in the right-hand column. As illustrated in FIG. 6, the folder table 190 includes unique IDs or keys of DIRECTORY_ID and DIRECTORY_SCR_ID (above the line in the table) which may be used to provide a unique number or ID for each folder used by the relationship management system. Each folder also includes a number of attributes including a type attribute (DIR_TYP_ID) which may be a private type, a group type, etc., a name attribute (DIRECTORY_NM), a description attribute (DIRECTORY_DESC), and an owner attribute (OWNER_ID) which identifies the owner or user who has primary access to the folder. Each folder may also include auditing attributes, such as attributes which indicate the user who created the folder (CREATE_ID), the date of creation (CREATE_DT), the last user to edit the folder (LAST_EDIT_ID), the name of the user who performed the last edit (LAST_EDIT_NM) and the last edit date (LAST_EDIT_DT). Of course, other attributes may be provided for other functions performed using the folder. One attribute however, illustrated in FIG. 6 as the SHARE_EXISTENCE_IND attribute, may be used to set a default value for the opt-in flag 154 of FIG. 4 or 174 of FIG. 5. Thus, the default value of the SHARE_EXISTENCE_IND attribute may be set on a folder basis and this value determines the default setting to which the opt-in flag 154 or 174 will be set within the join table 150 or the user-contact table 170 for each user-contact pair created within the join table 150 or the user-contact table 170 for a particular folder. Of course, the value specified by the SHARE_EXISTENCE_IND attribute may be changed using, for example, the box 138 in the screen display of FIG. 2.

Referring now to FIG. 7, an example join table 192 and the attributes thereof are illustrated. In particular, the join table 192 includes unique keys defining the contact (LISTING_ID and LISTING_SRC_ID) and the folder (CONTAIN_DIR_ID and CONTAIN_DIR_SRC_ID) pair. Each contact-folder pair includes additional attributes such as auditing attributes (the CREATE and LAST attributes as defined above) and other attributes not specifically needed to determine which users have a relationship with a particular contact. Likewise, each contact-folder pair includes an EXISTENCE_IND attribute which stores the value of the opt-in flag for this contact-folder pair and an EXISTENCE_DESC attribute which stores the string defining the relationship description entered into the section 140 of the screen display 130 of FIG. 2 for this contact-folder pair (which is a user-contact pair). Of course, each entry in the join table 192 could have other attributes used to store other types of relationship description information, or used for other purposes by the relationship management system, if so desired.

Of course other methods of storing and determining relationships between users and contacts using tables in the database 112 may be used as well to enable the user-contact routine 120 to determine which users have a relationship of some kind with any particular contact. The user-contact routine 120, as described herein, enables the relationships between users of the relationship management system and any particular contact stored in the database associated with the system to be determined quickly and accurately because this information is automatically stored, created or deleted when a user references a contact or deletes a contact from a folder or otherwise indicates a relationship with a contact. Furthermore, because the relationship information is stored in and determined from tables, such as those used to perform other functions within the relationship management system, no one has to manually enter or update a user-contact reference list, which makes the relationship information determined by the user-contact reference routine 23 described herein more accurate and reliable. Still further, the opt-in flag enables a user to hide the fact that the user has a relationship with a particular contact, assuring privacy where needed or desired. Likewise, the relationship description, type and strength or other relationship description fields provide a user with more information about the relationships between users and any specified contact than that provided by a manually created list of user-contact relationships typically created by known systems.

Figure 8:
FIG. 8 is an example screen display used in a relationship management system to enable a user to request a determination of relationship pathways to an entered target individual reference stored in a database.

In another embodiment, the user-contact routine 120 accepts a designation of the target person from a user (e.g., Ed Roberts) and subsequently initiates a pathway determination, which will be described with respect to FIG. 8. As illustrated in FIG. 8, a screen display 200, which may be created by the display routine 118, is displayed to the user who has designated a desired target individual. In this illustrated example, Ms. Jane Tarnoff is the target individual. When a target individual is designated, the screen display 200 displays a person overview where the name of the contact is displayed in a first field 202. As illustrated, the first field 202 may also display information including business associations, title, phone numbers, an e-mail address, and a web site address for Jane Tarnoff.

Additionally the screen display 200 includes a profile field 204 that allows the user to selectively view information about the target individual such as employment information (which is shown expanded in a field 204), educational information, contact information, etc. Further, a notes section 206 allows the user to view notations stored within the database 112 from other users (e.g., shown as "Firm Notes") or notations written by the particular user about the target person. The display routine 118 may also display on the screen display 200 a listing of related people, companies and organizations as illustrated in field 208. This field can be controlled to display co-workers of the user who know the target person, key relationships between users of the database and the target individual, common company or organization affiliations of users and the target person, etc.

Another field shown in FIG. 8 is an "Actions" field 210, which allows the user to select from a number of various functions. One of these functions is a "View Relationship Map" function labeled by reference number 212. The user (e.g., in the previous example, Ed Roberts or someone else having access to Ed Roberts' private folder) selects this function to plot relationship pathways or connections between the user and the designated target person. Thus, when a starting person, such as Ed Roberts or a user viewing the Ed Roberts' folder, wants to find relationship connections or pathways to the target individual, i.e., Jane Tarnoff, the starting person initiates plotting of a relationship connection via the function 212, which first causes the relationship management routine 110 to implement the user-contact reference routine 120 that searches the database 112 for all of the users or folders, or some subset of the users or folders, such as all private folders, that reference the target individual, as well as information stored in the database 112 about the target person. The routine then returns a list of found user-contact pairs to the interface 102 for use by the relationship pathway determination routine 122.

Figure 9A:
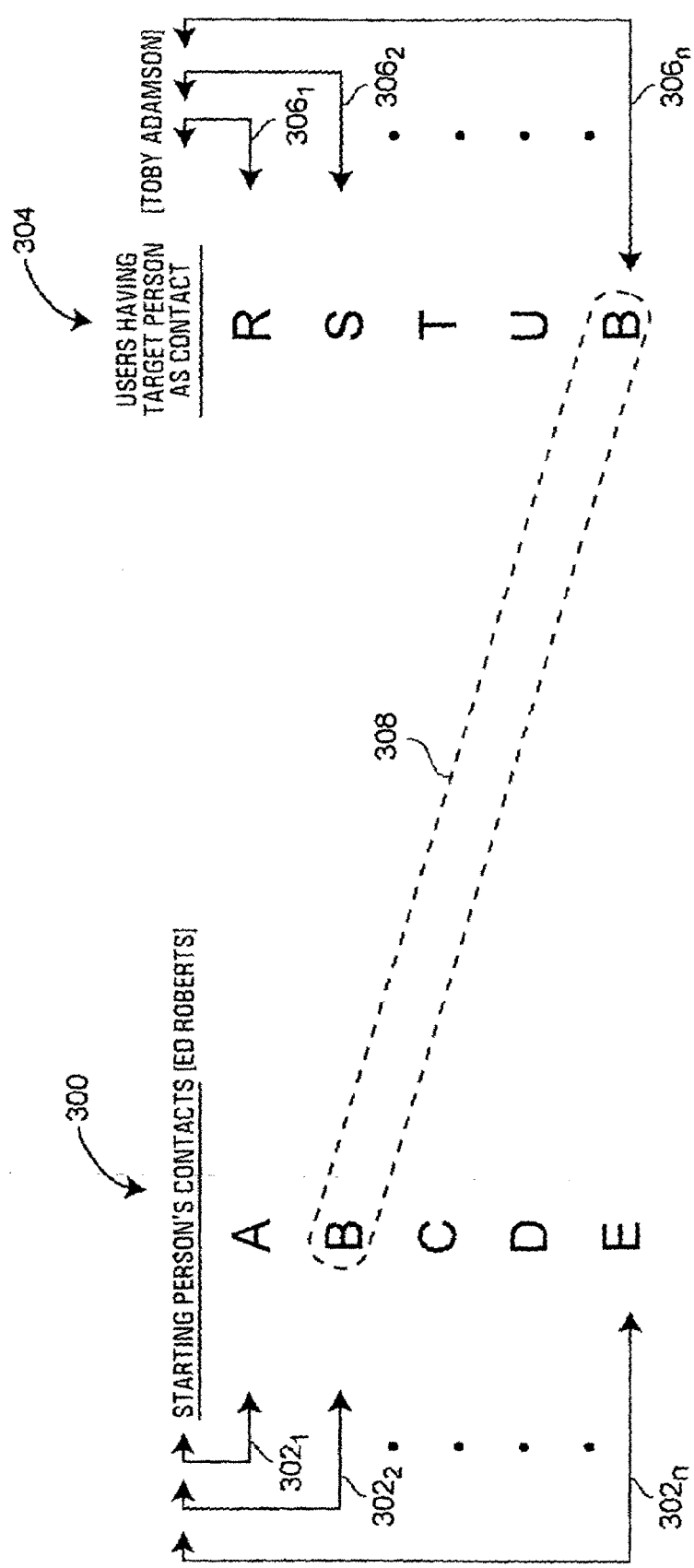
FIGS. 9A-9C are diagrams illustrating varying degrees of user-contact information for users of a relationship management system that is used to determine respective varying degrees of determined relationship pathways.

Once the information is delivered by the user-contact reference routine 120 to the relationship pathway determination routine 122, the routine 122 may link or intersect user-contact pairs such that any two adjacent entities in the determined pathway relationship is a user-contact pair. As an example, FIG. 9A illustrates a first level of pathway determination. A first group or list of contacts for Ed Roberts is returned as shown in column list 300. Here, a group of user-contact pairs is listed where the user, Ed Roberts is constant, and a particular number "n" of contacts (here shown as contacts "A" through "E") are shown. These contacts are typically persons at the same work organization as the user (e.g., people that Ed Roberts works with and are users of the database). Arrows 302 are illustrated to point out the user-contact pairs. For example, the user-contact pair of Ed Roberts (otherwise referred to as ER) and contact "A" is shown by arrow $302_1$, the user-contact pair ER-B by arrow $302_2$ and so on. The list 300 may also be assembled according to criteria other than simply other users of the database. For example, the contacts may be also be non-user contacts of Ed Roberts.

Similarly, the group of user-contact pairs associated with a target contact, e.g., Ms. Toby Adamson (otherwise referred to as TA), is illustrated by column list 304, which lists users R, S, T, U and B as knowing or having some relationship or connection with TA. Hence, FIG. 9A illustrates user-contact pairs, such as R-TA shown by arrow $306_1$, S-TA shown by arrow $306_2$ and B-TA shown by arrow $306_n$. The user-contact pairs 306 may be determined based on actual connections, potential connections or both. Examples of the relationship or connection criteria for determining potential connections include common work affiliations, organization affiliations and educational affiliations.

Given the determined user-contact pairs, the relationship pathway determination routine 122 may then search for user-contact pairs of the lists 300 and 304 that intersect or may be linked. In the example shown in FIG. 9A, a common user/contact "B" is found in both lists 300 and 304. Thus, the linking or pathway can be represented by ER→B→TA. From this pathway, it can be seen that adjacent entities (i.e., ER and B or B and TA) in the relationship pathway include respective ones of the user-contact pairs. This first level contact pathway corresponds essentially to the Who-Knows-Who™ feature described above because it tells Ed Roberts that "B" knows Toby Adamson.

Figure 9B:
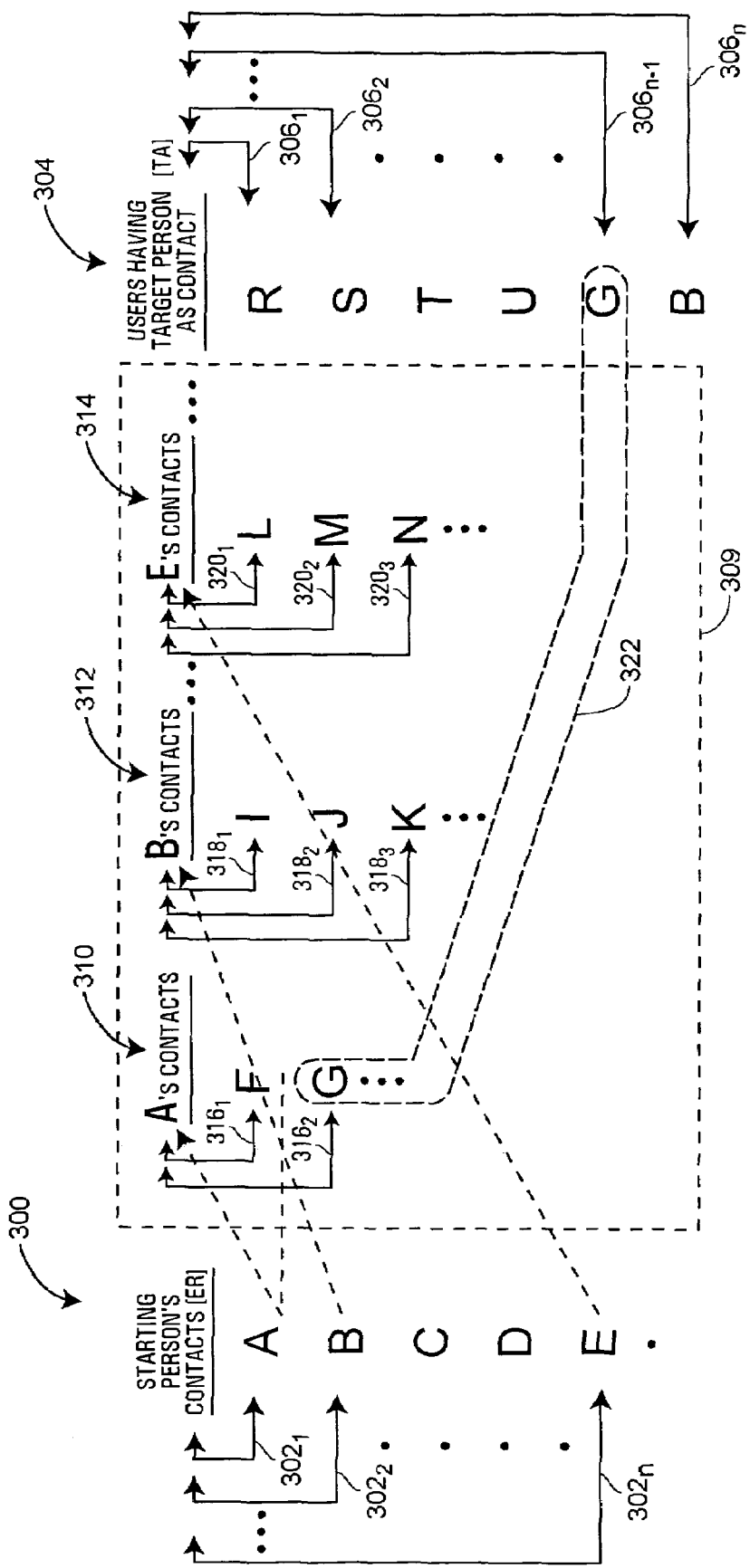

An example of a multiple linking or pathway, i.e., where three or more contact pairs are used to make a pathway determination, is illustrated in FIG. 9B. Such higher degrees of pathway linking may be performed when no first level pathway can be determined or when multiple pathways are desired. Additionally, the additional user-contact pairs may be determined by the routine 120 at one time or the routine 120 may be configured to perform additional searching after the first level pathways are found non-existent or a user requests further pathways. As shown in FIG. 9B, the column lists 300 and 304 of Ed Roberts' contacts and users having actual or potential connection to Toby Adamson are respectively shown similar to FIG. 9A. Additionally, however, the routine 122 then accesses further retrieved user-contact pairs for each of the contacts of Ed Roberts' who are users of the system; in this case users A, B and E being illustrated in table 309. Thus, column lists 310, 312 and 314 illustrate A, B and Es' contacts stored in the database 112 for these users or, in other words, the user-contact pairs for each of these users, which are indicated by arrows 316, 318 and 320, respectively. The routine 122 then plots intersections or pathways between the user-contact pairs in the lists 316, 318 and 320 and the user-contact pairs of column list 304. An example of a plotted pathway 322 is shown including the following user-contact pairs: ER-A (pair $302_1$), A-G (pair $316_2$) and G-TA (pair $306_{n-1}$), which form the pathway of ER→A→G→TA. Again, as in the previous example, the adjacent entities in the pathway consist of user-contact pairs.

Figure 9C:
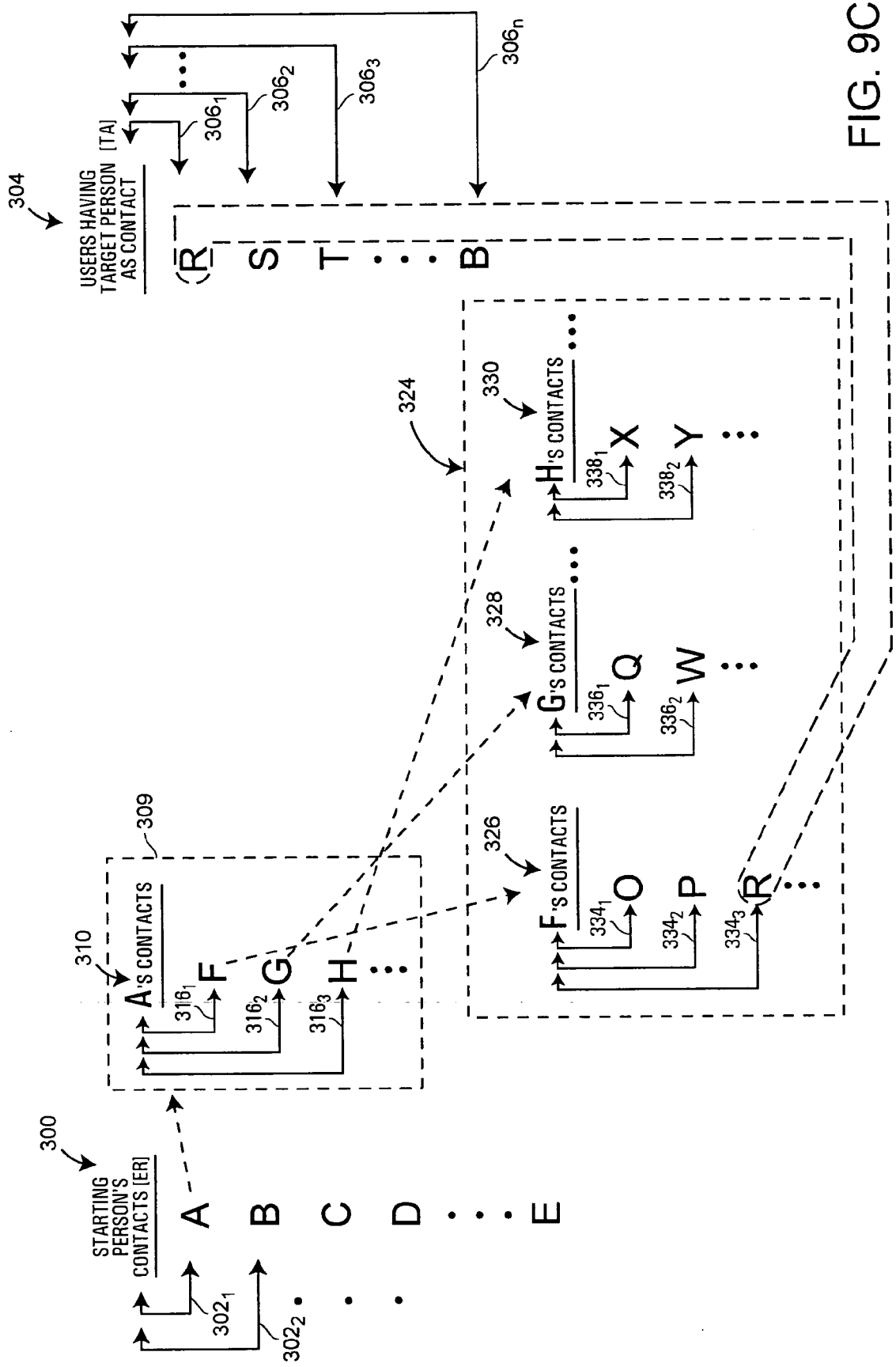

As an example of yet further degrees of pathways, FIG. 9C illustrates a case where further intermediate users are required or desired for determining additional degrees of relationship pathways. As shown, the column lists 300 and 304 of Ed Roberts' contacts and users having actual or potential connections to Toby Adamson are respectively shown similar to FIGS. 9A and 9B. Also, the further retrieved table 309 of user-contact pairs for each of the contacts of Ed Roberts' who are users of the system is utilized. From the contact listings for each of the users in table 309, additional tables are formed for each of the system users in each of columns of user-contact pairs. As shown in FIG. 9C, one such table 324 is illustrated, wherein contacts stored for each of the users in A's contact list 310 are accessed. As shown in table 324, exemplary column lists for A's contacts F, G and H are shown in columns 326, 328 and 330, respectively. The pathway determination routine 122 then checks to see if any intersections of the user-contact pairs in column list 326, 328 and 330, for example, intersect with the user-contact pairs 306 of column list 304. One such intersection is illustrated by reference number 332 showing that F and TA have a common contact/user R. Thus the plotted relationship pathway in this case consists of user-contact pairs ER-A (pair $302_1$), A-F (pair ($316_1$), F-R (pair $334_3$), and R-TA (pair $306_1$). In other words, the relationship pathway is ER→A→F→R→TA, where adjacent entities in the pathway comprise a user-contact pair.

As will be appreciated by those skilled in the art, the length of the relationship pathways may include even longer strings of linkings. Nevertheless, it can also be appreciated that longer pathways illustrate weaker or more tenuous links between the starting person and target due to the higher number of intermediate persons. Such considerations may be programmed into the pathway determination routine 122 by limiting the lengths of the pathways to some predetermined maximum number of contact pairs. Additionally, when a user does not opt-in a contact, this contact may be proscribed from inclusion in a viable user-contact pair to be used by the pathway determination routine 122.

According to another example, the pathway determination routine 122 can also determine potential pathways based on commonalities between users of the system and the target person. The users of the system could include people in the starting person's folder, whether users of the database 112 or not, as well as all the users of the database 112. The potential pathways are then determined based on, for example, three categories or criteria. The first criterion is common companies or employers to which the target person and the database users or other persons in the starting person's folder were or are related. For example, the routine 122 determines that the target person and a contact person in the starting person's folder both worked for Motorola during a particular time period. Thus, a commonality exists that can be used by the starting person. A next criterion is common educational backgrounds. For example, the routine 122 will determine common colleges attended, for example, between the target individual and the database users or other persons in the starting person's folder. The third criterion is common organizational affiliations. Examples of such affiliations include boards of directors, charitable organizations, professional associations, etc.

Figure 10A:
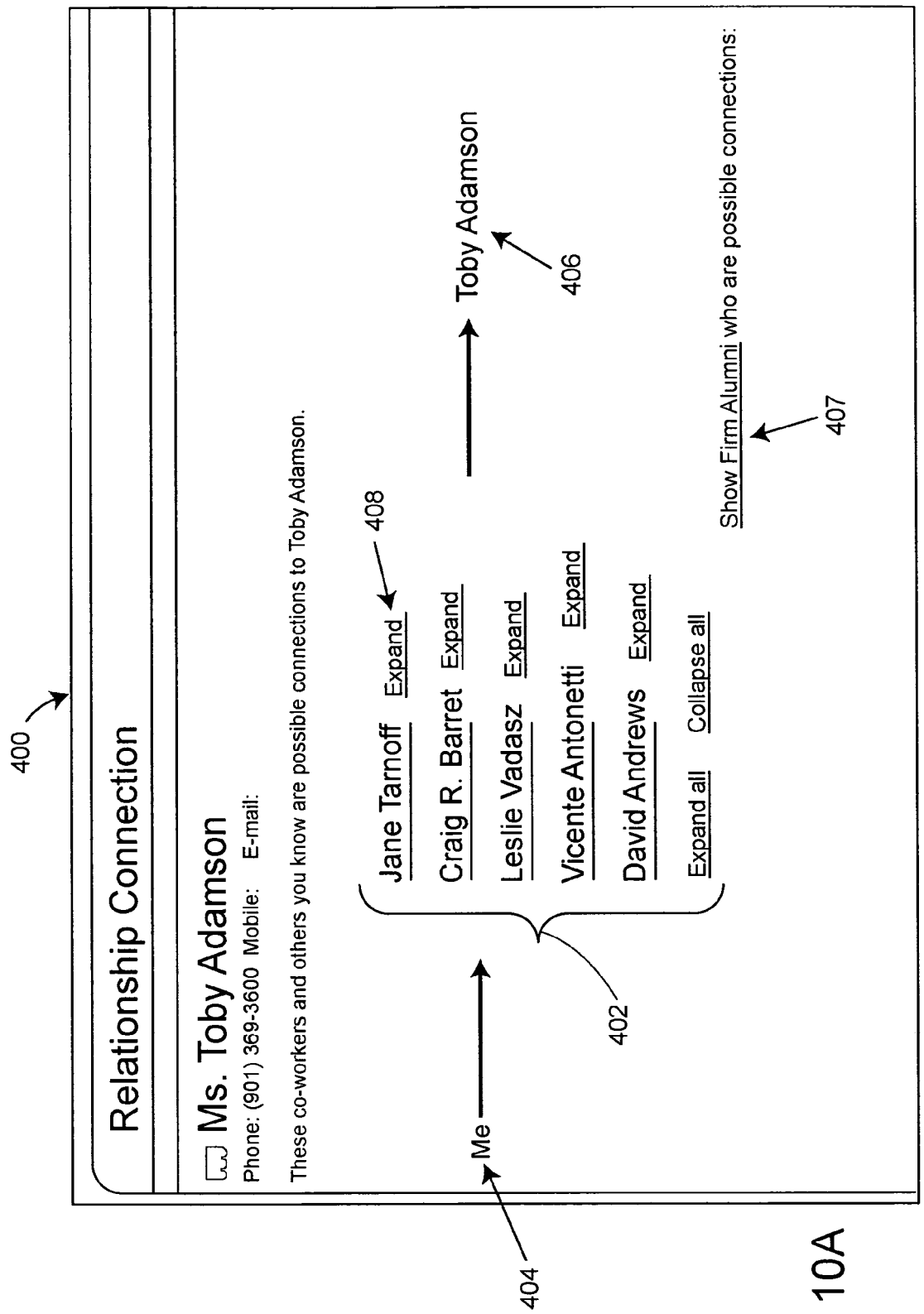
FIG. 10A is an example screen display illustrating a prioritized list specifying relationship pathways determined in a relationship management system between a starting person and a target individual along with information about the relative strengths of the determined relationship pathways.
Figure 10B:
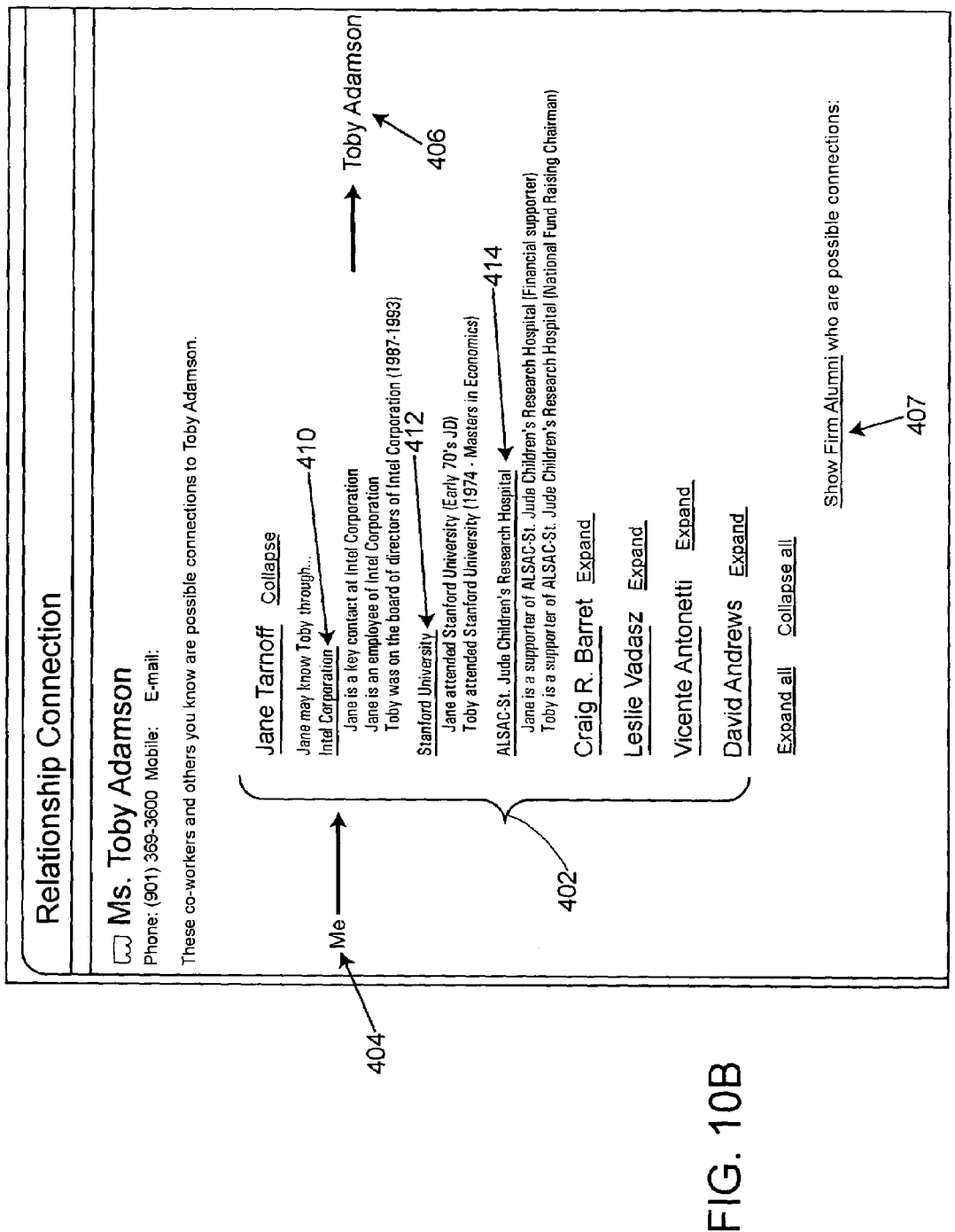
FIG. 10B is an example screen display illustrating an expanded view of the prioritized list illustrated in FIG. 10A.

As mentioned above, upon running the relationship pathway determination routine 122, the relationship management system 110 may use the display routine 118 to display a screen such as those illustrated in FIGS. 10A and 10B, which show the results of the determined pathways between a starting person (e.g., Ed Roberts (appearing to the user as "Me")) and a target person (e.g., Toby Adamson). As illustrated in the example of FIG. 10A, the relationship pathway determination routine 122, after determining users of the database who have connections to Toby Adamson, causes the display routine 118 to return a display screen 400 to the requesting user. As illustrated, the screen 400 displays a list 402 of those users of the database who are potential connections between the starting person 404 (labeled "Me") and the target person, such as Ms. Toby Adamson 406. With the list 402 illustrated in FIG. 10A, the starting person 404 who executed the relationship pathway determination routine 122, can then contact any of the listed users (e.g., Jane Tarnoff, Craig Barret, Leslie Vadasz, etc.) about the target person, i.e., Toby Adamson, to get more specific information about the target person, such as for the purpose of making an introduction between the starting person and the target or simply contacting the starting person, knowing that the starting person potentially has a connection to one or more of the users in the list 402.

Another feature of the relationship determination routine 122 that is illustrated in FIG. 10A is a field 407 enabling the starting person to direct the routine 122 to search for additional relationship pathways utilizing information from alumni or past employees of the firm where the starting person works or former users of the database 112. This feature may be helpful, for example, when the routine 122 returns little or no connections using current users or contact information stored in the database 112.

Further, the starting person 404 has the option of expanding the particular linkings to view more detailed information concerning the potential connections between the target person and the users or other persons displayed in list 402. Specifically, a selection field 408 labeled as "Expand" allows the starting person the expand the information details as illustrated in FIG. 10A. When a user selects the expand field 408, the display routine 118 causes the viewable information to be expanded as illustrated in FIG. 10B. In this example, information concerning Jane Tarnoff is displayed. As illustrated, information that is displayed is categorized into at least three different fields generally corresponding to the three criteria discussed previously. Thus, a first information field 410 illustrates employment or company affiliations common to the potential linking person (e.g., Jane Tarnoff) and the target person (e.g., Toby Adamson). In the illustrated example, the information displayed in field 410 communicates that Jane Tarnoff is an employee of Intel Corporation, as well as a key contact for at least one user of the database, and that Toby Adamson was on the board of directors of Intel.

A second information field 412 that is displayed and corresponding to the second criterion discussed previously is common educational affiliations. In the example of FIG. 10B, the information displayed indicates that both Jane Tarnoff and Toby Adamson attended Stanford University. Additional information may include, for example, degrees conferred and years attended, as illustrated.

Another information field 414 illustrates common organization affiliations. In the example of FIG. 10B, information shows that both Jane Tarnoff and Toby Adamson are supporters of ALSAC-St. Jude Children's Research Hospital. Additional information concerning the capacity of respective person's involvement may also be displayed as further illustrated in FIG. 10B.

The order of persons appearing in the list 402 illustrated in FIGS. 10A and 10B also may be utilized to indicate links from the strongest to the weakest (displayed from top to bottom in this example), for example, the relative strengths of the plotted relationship connections. Thus, the starting person or user who initiated the relationship pathway determination routine 122 can determine which of the other users to talk to first based on this further information displayed by the order of list 402. The displayed listing order is derived using a pathway weighting routine 124 and a prioritization routine 126, as illustrated in FIG. 1, that may be called by the relationship determination routine 122. The routines 124 and 126 will be described further in relation to FIGS. 11 and 12.

The weighting routine 124, in particular, is used to determine a strength of each relationship pathway determined by the relationship pathway determination routine 122 by using the relationship strength information stored in the database 112 regarding strengths of each of the user-contact pairs as well as accessing the information concerning common employment or company affiliations, educational affiliations and organizational affiliations. This retrieved information concerning the individual user pairs in a pathway is used by the weighting routine 124 to obtain an aggregate weight value according to a predetermined algorithm. In deriving the aggregate weight value, the algorithm may take into account factors such as the type of relationship (e.g., personal, family, social or business) for each user-contact pair, whether the relationship is current or a former relationship, the total number of user-contact pairs in the relationship pathway, the locations of the user-contact pair within the pathway (e.g., near the beginning, in the middle, or at the end), etc. to achieve a more accurate and qualitative correlation to the quantitative value computed. Furthermore, the weighting routine may assign higher importance to factors such as common workplace or organizational affiliations, while according factors such as common educational affiliations a lower importance. The returned cumulative, aggregate or average weight value may then be used to assign a quantitative value that approximates a qualitative measure of each determined relationship pathway.

Figure 11:
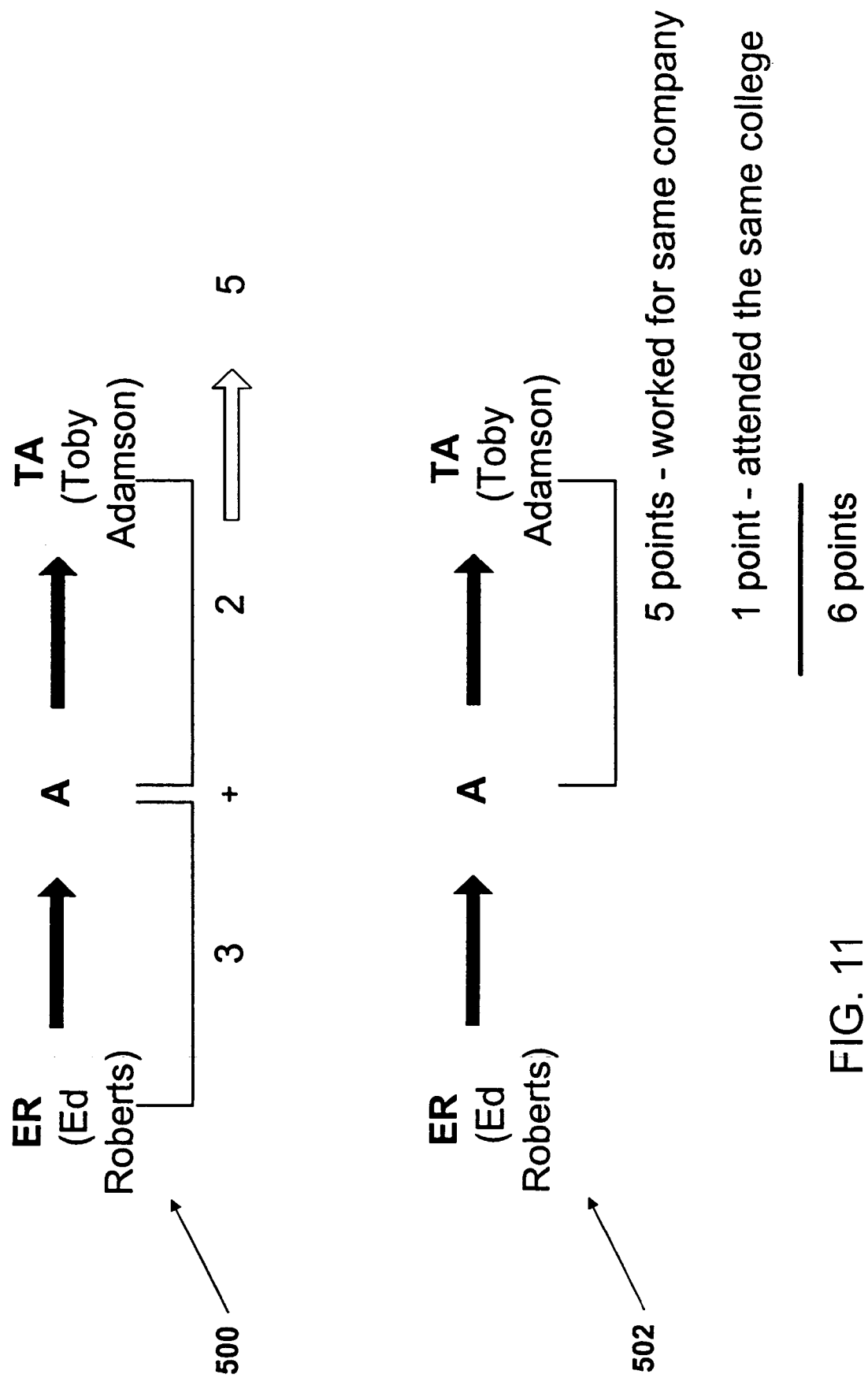
FIG. 11 is an illustration of the operation of a weighting routine that may be used to determine quantitative weights of relationship pathways determined in a relationship management system.

As examples of aggregate weightings, FIG. 11 illustrates three different relationship pathways 500 and 502, all between the same starting and target persons (e.g., Ed Roberts and Toby Adamson). In pathway 500, including user-contact pairs ER-A and A-TA, the weighting routine 124 retrieves relationship strength data for each pair. Thus, for example, the relationship strength information stored for the relationship between Ed Roberts and contact A is a quantitative value of 3. Similarly, the relationship between user A and target contact Toby Adamson is 2. These quantitative strength values are input to the weighting algorithm of routine 124, which returns an aggregate value 5 for this relationship pathway, as an example. Alternatively, the weighting algorithm could determine an average, such as 2.5 in this particular example. It will also be appreciated by those skilled in the art that weightings may be similarly computed for pathways have more than one intermediate user between the starting person and target individual.

As an alternative example, a relationship pathway 502 is illustrated that includes the same pairs ER-A and A-TA as pathway 500. However, different from the example of pathway 500, the routine 124 determines the strength of the pathway based on the criteria of organizational, workplace and educational affiliations. Furthermore, the pair A-TA is only considered in determining the strength of the pathway 502. Thus, as shown in this example, because A and Toby Adamson have two common connections of company and educational affiliations, these commonalities are used in computing the pathway strength. As illustrated, the common company affiliation is assigned a weight of five points. This point assignment is an arbitrary predetermination. That is, the database may be customized at set up by the database client to assign particular weightings as deemed important by the client. Moreover, the point assignments may be determined dependent on whether the connection is current or in the past. Thus, for example, the points assigned for a current or recent common employment affiliation could be five points, whereas a less recent common affiliation is only assigned two points.

The example pathway 502 also shows that the existence of common educational affiliations between TA and A is also accorded a point value, e.g., one point as shown in FIG. 11. Once all points are assigned, an aggregate sum of the point values may be used to assign an overall strength value to the pathway 502. This aggregate value is illustrated by the total sum of six points in FIG. 11.

Additionally, the weighting routine 124 may direct the display routine 118 to provide a display indication of an aggregate weight for each pathway and, if desired, respective relationship weights for each of the user-contact pairs in a pathway.

Figure 12:
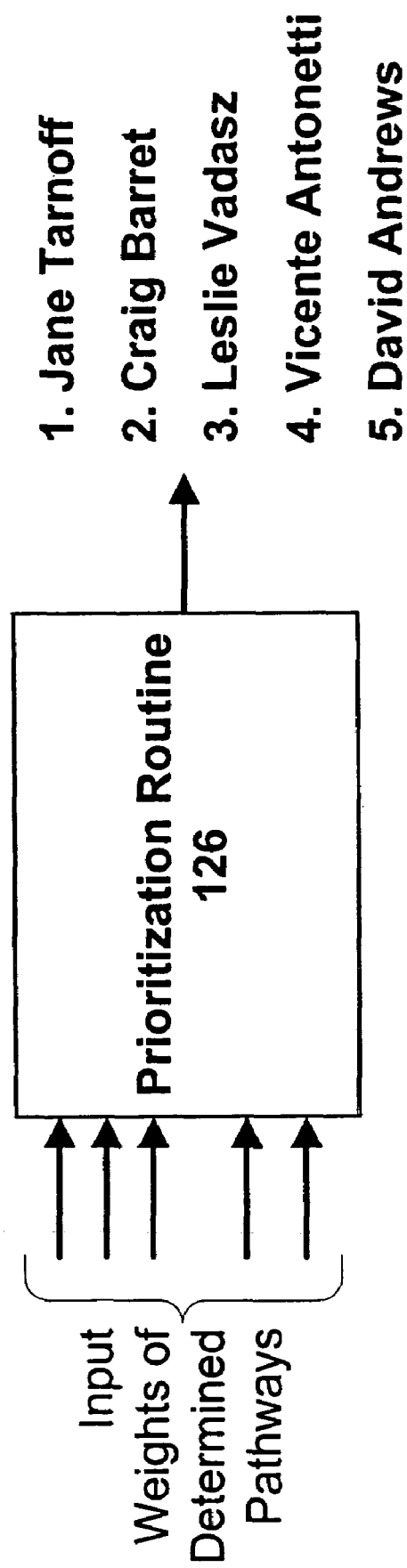
FIG. 12 is an illustration of the operation of a prioritization routine that may be used to determine priority among multiple relationship pathways determined in a relationship management system.

For the purpose of determining the order that the list 402 is displayed to the user, the prioritization routine 126 may be used to prioritize the determined relationship pathways based, in part, on the weights determined by routine 124. As illustrated in FIG. 12, the weights of the determined pathways are input to routine 126, which outputs a listing from highest to lowest strength, for example. The example of FIG. 12 illustrates the listing displayed in FIGS. 10A and 10B.

Prioritization may be as simple as listing the pathways from highest to lowest aggregate strength values, thereby assigning highest priority to those pathways with the highest aggregate strength value. The routine 126, however, may also apply further factors to determine the highest priority to lowest priority pathways. For instance, if two pathways have the same aggregate strength rating, factors such as whether the relationships in the pathway are predominately business relationships or personal relationships may be considered to determine which of the two pathways would be given the higher priority listing. Also, for those pathways having the same strength ratings, the prioritization routine 126 may arbitrate between pathways by deeming the pathway having the highest single strength value as the strongest potential pathway.

Figure 13:
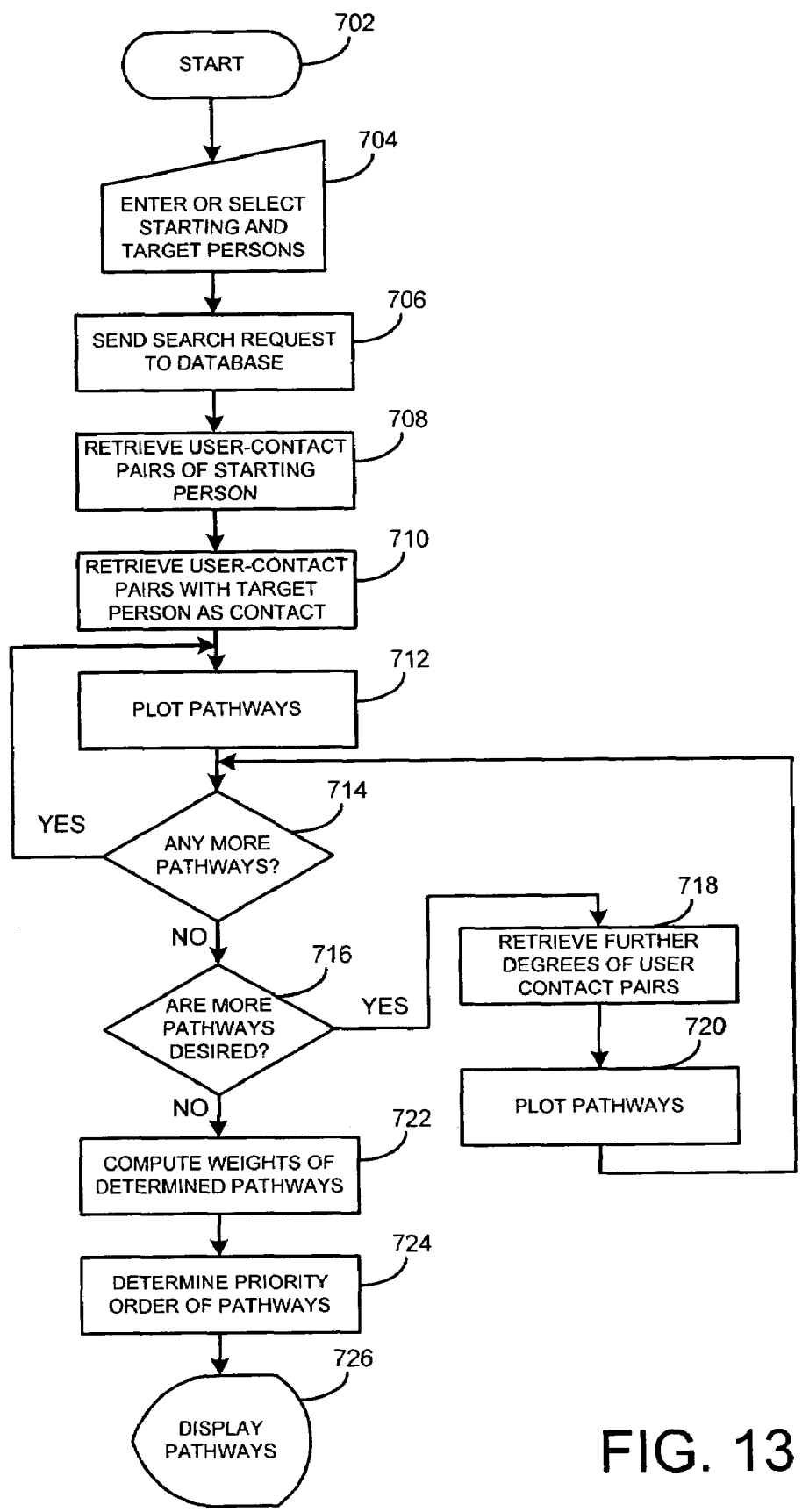
FIG. 13 is a flow diagram of a procedure that may be used to determine relationship pathways in a relationship management system.

A method for enabling the pathway determination functionality of the relationship management system 110 is described with respect to the flow diagram of FIG. 13. As shown, the operation starts at block 702 when a user of the system 110 initiates finding relationship pathways or connections by, for example, selecting field 212 (e.g., "View Relationship Map") shown previously in FIG. 8. The user will either be prompted to enter a starting person, if the user is not the starting person, or simply be prompted to continue if the user is the starting person at block 704 as executed by the database access routine 116. At a block 704, the user enters or selects a target person, with whom the system 110 will determine relationship pathways from the starting person. The routine 116 then initiates a search request to the database 112 as indicated at block 706. Next, the database access routine 116 initiates retrieval of user-contact pairs for the starting person from that person/user's folder as shown at block 708. Additionally, the routine 116 retrieves user-contact pairs that have the target person as a contact, also shown at block 710.

Once user-contact pair data has been retrieved and assembled (e.g., by the user-contact reference routine 120), the relationship pathway determination routine 122 plots pathways that link the starting person to the target person as indicated by block 712. Once one or more pathways have been determined, a query is made whether further pathways may be determined as indicated at decision block 714. If further pathways may be determined, flow loops back to block 712 to plot further pathways.

Alternatively, if no more pathways are to be determined as found at block 714, the flow proceeds to decision block 716. If the user desires more pathways, as initiated by a prompt to the user through the display routine 118, for example, the flow proceeds to block 718. At block 718 the database access routine is called to retrieve further degrees of user-contact pairs, e.g., user-contact pairs for all user/contacts of the starting person. The relationship pathway determination routine 122 then plots further relationship pathways between the starting person and the target person using the additional user-contact pairs retrieved as shown in block 720. Flow then proceeds back to block 714, where a determination is once again made as to whether further pathways exist. The user is again prompted to determine if more pathways are desired at block 716. Alternatively, the determinations in blocks 714 and 716 could be effected by an automatic process where the routine 122 is used to determine all possible pathways up to a predetermined number of user-contact pairs that may be used to plot a pathway.

After no more pathways are desired, as determined at block 716, flow proceeds to block 722 where the pathway weighting routine 124 computes quantitative weights for each of the determined relationship pathways. Next, the pathway prioritization routine 126 determines a priority order in which to display the pathways to user as shown in block 724. Finally, after the priority order is determined, the display routine 118 is called to display a listing of the prioritized relationship pathways to user's terminal 102 as indicated at block 726.

Methods for enabling the retrieving of the user-contact pair (block 708) to determine which of the users of the relationship management system know the starting person will be now be described in more detail with respect to FIG. 14. Generally speaking, as described above, a set of user-contact pairs is stored within the database 112 and each of these user-contact pairs evidences the existence of a relationship of some kind between the contact indicated by the contact portion of the user-contact pair and the user indicated by the user portion of the user-contact pair. The contact portion may directly or indirectly indicate a particular contact and may be, for example, a contact ID. Likewise, the user portion of the user-contact pair may directly or indirectly indicate one or more particular users. The user portion may be, for example, a user ID or a folder ID. If the user portion is a folder ID, then the user associated with the user-contact pair may be one or more of the users having access rights to the folder specified by the folder ID. However, the user-contact pair may include any other type of information which indicates, either directly or indirectly, a relationship between a user and a contact.

Figure 14:
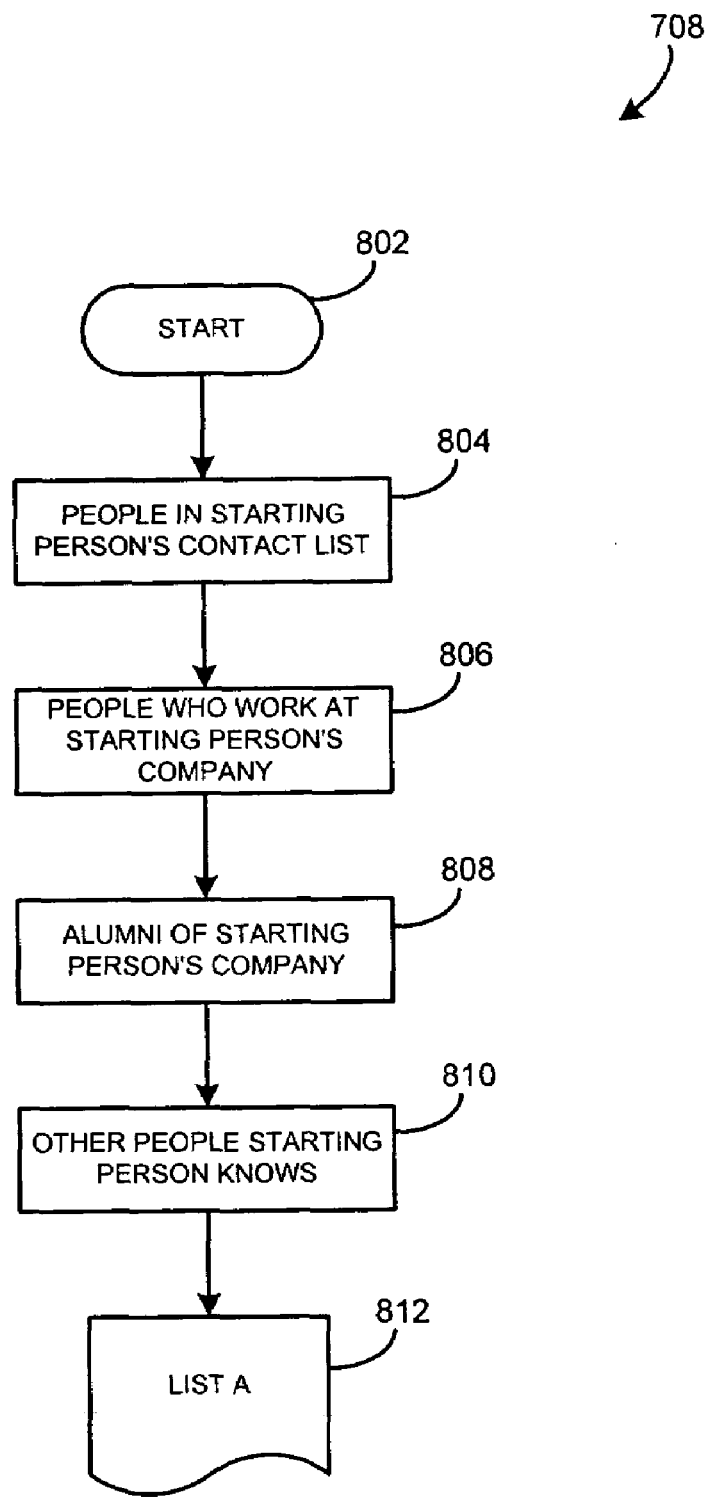
FIG. 14 is a flow diagram of a procedure that may be used to retrieve user-contact pairs of a starting person.

As shown in FIG. 14, an example of the retrieval of user-contact pairs is initiated when the database access routine 116 initiates retrieval of user-contact pairs of the starting person (block 708) at block 802. The database access routine 116 may initiate the search by searching the database 112 to retrieve all the user-contact pairs for the starting person from that person/user's folder at block 804. The retrieved user-contact pairs may be similar to a list of contacts within the database that are considered "my contacts" or contacts contained within the user's rolodex. The database access routine 116 may then initiate a search of the database 112 for contacts that work at the starting person's company at block 806. The company search may be based upon a company name stored with each contact in the database 112 and may include both employees and consultants.

After a search for all contacts that work at the starting person's company, at block 808, the search may be expanded to include all former employees of the starting person's company. This may include any company alumni, such as former employees, retirees, or the like. In some embodiments, the system 100 may be programmed to search alumni at block 808 only is specifically requested, such as for example at block 716. To further supplement the user-contact pair search, the entire database 112 may be searched to return any contact for which the starting person may have any other relationship at block 810. This may include, for example, contacts that may be related to the starting person, or contacts that are serviced by the starting person (e.g., the starting person is the account manager).

Once the retrieval of user-contact pairs of the starting person is complete, the database access routine 116 may merge the results of the various searches (blocks 804, 806, 808, 810) into a "List A" 812. "List A" 812 may then contain a list of contacts that the starting person probably knows.

Figure 15:
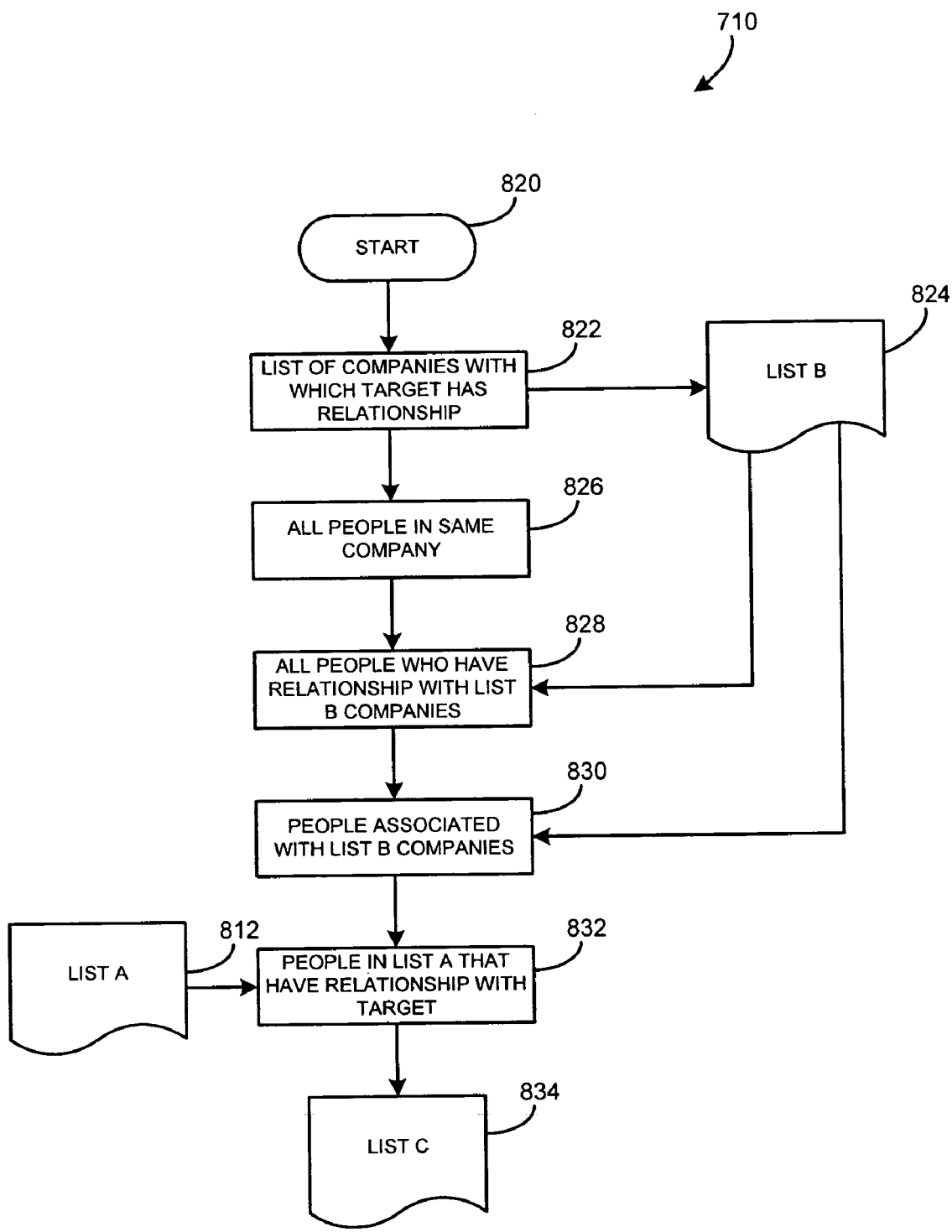
FIG. 15 is a flow diagram of a procedure that may be used to retrieve user-contact pairs of a target person.

Turning now to FIG. 15, an example of the retrieval of user-contact pairs of the target person (block 710) is illustrated. As shown, the retrieval of the target person's user-contact pairs is initiated at block 820. The database access routine 116 may then search the database 112 for a list of all companies, or other organizations, with which the target person has a relationship (block 822). This result set may include schools the target contact attended, companies for which they work, former companies for which they worked, charity, civic, and professional organizations with which they are associated, or the like. The results of the search at block 822 may be merged into a "List B" 824.

The database access routine 116 may then a search of the database 112 for contacts that work at the target person's company at block 826. The company search may be similar to the search conducted at block 806 and may include both employees and consultants. The search may then be continued at block 828 to include all people who have a relationship with any of the companies connected with each of the contacts in "List B" 824. For example, the search at block 828 may include all contacts who are involved with the same charity organization, or alumni of the same university.

The database access routine 116 may further search the database 112 for all contacts associated with the company of each contact in "List B" 824 at block 830. This search may include any current or former employee, any company alumni, retiree, or the like. The system 100 may then be programmed to search the database 112 for all people in "List A" 812 that have a relationship with the target person at block 832. This search may include all "List A" contacts who have a contact relationship, such as being a relative, of the target person.

Once the retrieval of user-contact pairs of the target person is complete, the database access routine 116 may merge the results of the various searches (e.g., blocks 822, 826, 828, 830, 832) into a "List C" 834. "List C" 834 may then contain a list of contacts that the target person probably knows.

Figure 16:
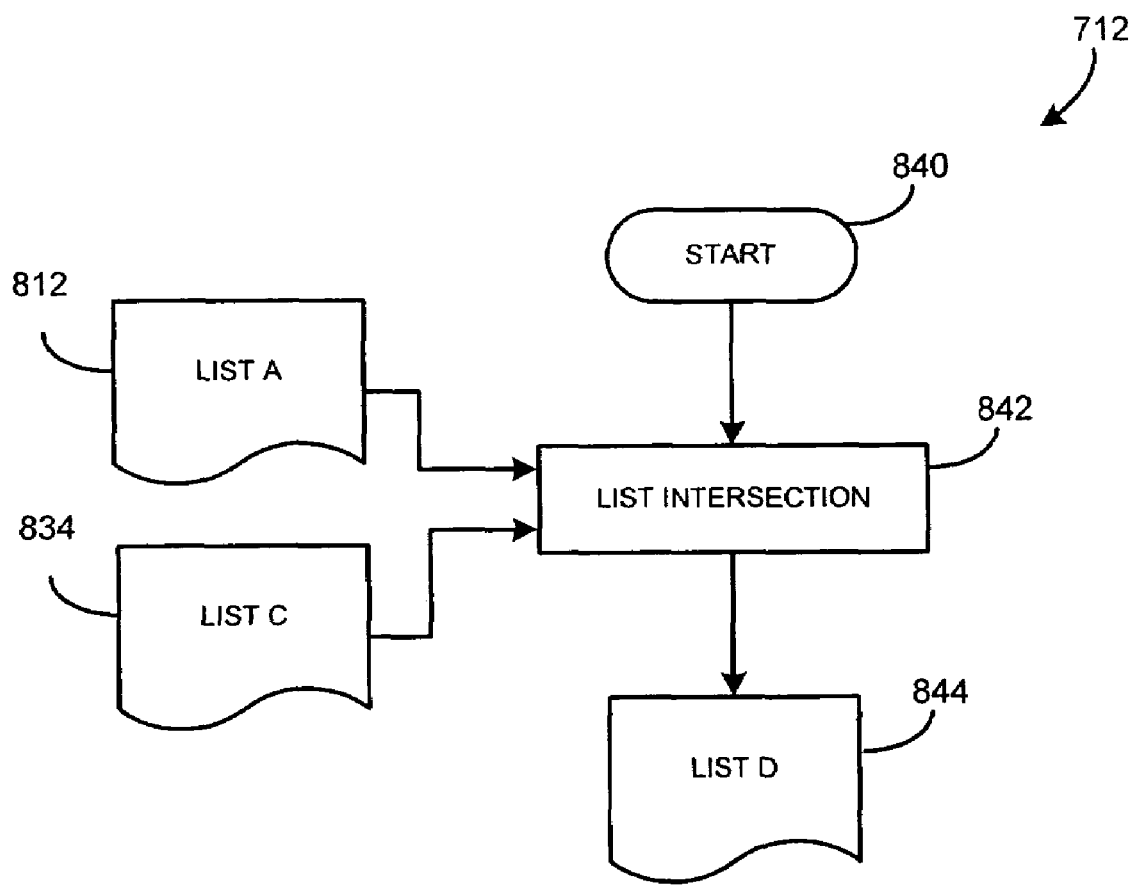
FIG. 16 is a flow diagram of a procedure that may be used to plot relationship pathways, which procedure may be used by the relationship pathway flow diagram of FIG. 13.

As illustrated in FIG. 16, an example of the plotting of pathways (block 712) is shown. As shown, the plotting of the pathways is initiated at block 840. The system 100 may be programmed to determine the intersection of "List A" 812 and "List C" 834 at block 842. While it is understood that an instance of a single contact may exist multiple times in both "List A" 812 and "List C" 834, the intersection is preferably a distinct set of contacts. Once the intersection has been determined, at block 844, one or more reasons for inclusion is determined. The reason may be determined based upon the reason for inclusion in "List A" 812 and "List B" 824. For example, a contact reason may be that the contact was included in "List A" 812 because the contact works at the same company as the starting person (block 806). The results of the list intersection may be merged into a "List D" 844. The "List D" 844 may then be processed by the routine 110 at the block 714 as described in detail above.

Although the routine 110, including the user-contact reference routine and the visibility checking routine described herein are preferably implemented in software stored in, for example, a memory of a user workstation or user interface, these routines may alternatively or additionally be implemented in hardware, firmware, etc., as desired. If implemented in software, the routines may be stored in any computer readable memory such as on a magnetic disk, a laser disk, an optical disk or other storage medium, in a RAM or ROM of a computer, user interface, workstation or other processing device. Likewise, this software may be delivered to a user or to a processing device via any known or desired delivery method including, for example, over a communication channel such as a telephone line, the Internet, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A relationship management system adapted to be used with a processor, a database and a display device, comprising:
 a computer readable medium;
 a database storage routine stored on the computer readable medium and adapted to store, within the database, contact information for one or more contacts and one or more user-contact pairs, wherein each user-contact pair includes a contact indication that indicates one of the contacts and a user indication that indicates one of the users;
 a reference routine stored on the computer readable medium and adapted to be executed on the processor to access the database to determine whether a specified individual knows a specified contact, wherein the reference routine searches the user-contact pairs for the specified contact to locate at least one user-contact pair associated with the specified contact and wherein the reference routine determines one or more individuals that know the specified contact from the user-contact pairs; and
 a display routine stored on the computer readable medium and adapted to be executed on the processor to display, on the display device, an indication of whether the specified individual knows the specified contact.

2. The relationship management system of claim 1, wherein the database stores, for each of the user-contact pairs, a relationship field indicating relationship information pertaining to the relationship between the contact indicated by the contact indication and the user indicated by the user indication and wherein the display routine displays the relationship information for one or more of the user-contact pairs in which the contact indication indicates the specified contact.

3. The relationship management system of claim 2, wherein the relationship field stores a textual string input by a user to define the nature of a relationship between one of the users and one of the contacts and wherein the database storage routine queries the textual string and stores the textual string in the relationship field within the database.

4. The relationship management system of claim 2, wherein the relationship field stores an indication of a type of relationship between one of the users and one of the contacts and wherein the database storage routine queries the type of relationship and stores the indication of the type of relationship in the relationship field within the database.

5. The relationship management system of claim 2, wherein the relationship field stores an indication of the strength of the relationship between one of the users and one of the contacts and wherein the database storage routine queries the indication of the strength of the relationship and stores the indication of the strength of the relationship in the relationship field within the database.

6. A relationship management system configured to be used with a processor, a display device and a database that stores contact information defining a set of contacts associated with each of a plurality of users of the database, comprising:
    a computer readable medium;
    an input routine stored on the computer readable medium and adapted to be executed on the processor to accept a designation of a target individual;
    a contact information access routine stored on the computer readable medium and adapted to be executed on the processor to access the contact information in the form of user-contact pairs stored in the database;
    a relationship determination routine stored on the computer readable medium and adapted to be executed on the processor to utilize the user-contact pairs accessed by the contact information access routine to determine at least one relationship that links relationships between an individual and the target individual; and
    a display routine stored on the computer readable medium and configured to be executed on the processor to display, on the display device, an indication of the relationship.

7. The relationship management system according to claim 6, wherein the input routine is adapted to accept a designation of a starting person.

8. The relationship management system according to claim 7, wherein a first user-contact pair comprises the starting person and at least one of a contact individual associated with the starting person or one of the plurality of users.

9. The relationship management system according to claim 8, wherein a second user-contact pair comprises a target individual and one of the plurality of users having the target individual as a stored contact or having a potential relationship with one of the plurality of users of the database according to a predetermined criterion.

10. The relationship management system according to claim 9, wherein the predetermined criterion includes at least one of a common workplace affiliation between the one of the plurality of users and the target individual, a common educational affiliation between the one of the plurality of users and the target individual, and a common organizational affiliation between the one of the plurality of users and the target individual.

11. The relationship management system according to claim 6, wherein the relationship pathway determination routine is configured to examine a plurality of user-contact pairs, identify either a user or a contact individual common to two of the plurality of user-contact pairs and to link together user-contact pairs having identified common users or contact individuals.

12. The relationship management system according to claim 6, wherein the relationship pathway determination routine is further configured to determine a relationship pathway having a predetermined number of user-contact pairs that links the starting person to the target individual.

13. The relationship management system according to claim 6, further comprising a weighting routine stored on the computer readable medium and adapted to be executed on the processor to determine a relative strength of the at least one relationship pathway based on relationship strength information associated with the user-contact pairs within the relationship pathway.

14. The relationship management system according to claim 6, further comprising a prioritization routine stored on the computer readable medium and adapted to be executed on the processor to determine a priority rating for the determined relationship pathway based on predetermined priority criteria; and
    wherein the display routine is configured to display the determined priority rating of the determined relationship pathway.

15. The relationship management system according to claim 6, wherein the display routine is further configured to display relationship pathway information including at least one of common workplace affiliations between the target individual and a user of the database, common educational affiliations between the target individual and the user of the database, and common organizational affiliations between the target individual and the user of the database.

16. A relationship management system, comprising:
    a database storing contact relationship information for a multiplicity of individuals;
    at least one access terminal in communicative connection with the database, the at least one access terminal having a processor, a memory and a display device;
    an access routine stored in the memory and configured to be executed on the processor to access the database;
    a reference routine stored in the memory and configured to determine a list of individuals having commonalities with a target individual from the contact relationship information stored in the database; and
    a relationship connection determination routine stored in the memory and configured to be executed on the processor to plot one or more relationship connections between a starting individual and the target individual through the individuals in the determined list so that the one or more relationship connections facilitate future communications between the starting individual and the target individual.

17. The relationship management system according to claim 16, wherein the one or more relationship connections between the starting individual and the target individual further include potential relationship connections between the starting individual and the target individual determined based on at least one commonality criterion.

18. The relationship management system according to claim 17, wherein the commonality criterion includes at least one of a common workplace affiliation between the individuals in the determined list and the target individual, a common educational affiliation between the individuals in the determined list and the target individual, and a common organizational affiliation between the individuals in the determined list and the target individual.

19. The relationship management system according to claim 17, wherein the relationship connections between the starting individual and the target individual comprise a degree of contact relationship and wherein the starting individual and the target individual are both contacts of one or more common intermediate users of the database.

20. The relationship management system according to claim 17, further comprising a weighting routine stored in the memory and configured to determine respective quantitative strengths in the determined relationship connections based on relationship strength information stored in the database.

21. The relationship management system according to claim 17, further comprising a weighting routine stored in the memory and configured to determine strengths of the determined relationship connections based on at least a predetermined criterion that includes at least one of common workplace affiliations between individuals in the determined list and the target individual, common educational affiliations between individuals in the determined list and the target individual, and common organizational affiliations between individuals in the determined list and the target individual.

22. The relationship management system according to claim 21, further comprising a prioritization routine stored in the memory and configured to determine a priority order of the relationship connections based on the determined strengths, and wherein the display routine is configured to display the contact relationship connections according to the determined priority order.

23. A relationship management database system comprising:
    a database configured to store relationship information for a plurality of users;
    at least one computer having access to at least a portion of the relationship information stored in the database and having a memory storing:
    a search routine stored in the memory and configured to be executed by the computer at the request of a requesting user to search the relationship information stored in the database concerning a starting person and a target person;
    a user-contact reference routine stored in the memory and configured to:
        (a) determine a first set of user-contact pairs for the starting person, each of the first set of user-contact pairs for the starting person comprising the starting person as the user and one of a plurality of contacts known by the starting person and other users of the database as the contact; and
        (b) determine a second set of user-contact pairs for the target person, each of the second set of user-contact pairs comprising the target person as the contact and users of the plurality of users who have the target person as a contact or have at least one shared commonality with the target person as the user;
    a relationship pathway determination routine stored in the memory and configured to be executed by the computer to determine one or more relationship pathways between the starting person and the target person from among the first set of user-contact pairs and the second set of user-contact pairs so that the one or more relationship pathways facilitate future communications between the starting person and the target person.

24. The relationship management database system according to claim 23, wherein the relationship pathway determination routine is further configured to cause the search routine to retrieve additional user-contact pairs for determining further relationship pathways between the starting person and the target person having further degrees of separation that include common relationships or potential relationships determined among the additional user-contact pairs between contacts of the plurality of contacts known by the starting person and the users of the plurality of users who have the target person as a contact or have the at least one shared commonality with the target person.

25. The relationship management database according to claim 23 wherein the at least one shared commonality includes at least one of common workplace affiliations between a user of the plurality of users and the target person, common educational affiliations between the user of the plurality of users and the target person and common organizational affiliations between the user of the plurality of users and the target person.

26. The relationship management database system according to claim 23, wherein the memory further stores a weighting routine configured to determine strengths of the one or more relationship pathways through a predetermined process based on relationship strength information stored in the database.

27. The relationship management system according to claim 23, further comprising a prioritization routine stored in the memory and configured to determine a priority order of the common relationships based on predetermined priority criteria; and
    a display routine stored in the memory and configured to display the priority order of the common relationships to the requesting user.

28. A method for managing relationships in a database comprising:
    storing relationship information for a plurality of users in the database;
    searching the relationship information stored in the database to determine a starting person and a target person;
    determining a first set of user-contact pairs for the starting person, each of the first set of user-contact pairs for the starting person comprising the starting person as the user and one of a plurality of contacts known by the starting person and other users of the database as the contact;
    determining a second set of user-contact pairs for the target person, each of the second set of user-contact pairs comprising the target person as the contact and users of the plurality of users having the target person as a contact or having at least one shared commonality with the target person as the user; and
    determining one or more relationship pathways between the starting person and the target person from among the first set of user-contact pairs and the second set of user-contact pairs;
    using the determined one or more relationship pathways in a communication from the starting person to the target person so that the one or more relationship pathways facilitate a future communication between the starting person and the target person.

* * * * *

UNITED STATES PATENT AND TRADEMARK OFFICE
CERTIFICATE OF CORRECTION

| | |
|---|---|
| PATENT NO. | : 7,325,012 B2 |
| APPLICATION NO. | : 10/677113 |
| DATED | : January 29, 2008 |
| INVENTOR(S) | : Robert M. Nagy et al. |

It is certified that error appears in the above-identified patent and that said Letters Patent is hereby corrected as shown below:

In the Claims:

At Column 24, line 37, "rclationships" should be -- relationships --.

Signed and Sealed this

Nineteenth Day of August, 2008

JON W. DUDAS
*Director of the United States Patent and Trademark Office*